(12) United States Patent
Gundlach et al.

(10) Patent No.: US 11,160,284 B2
(45) Date of Patent: Nov. 2, 2021

(54) MEAT PROCESSING DEVICES TO CONTROL MEAT SLAB DIMENSIONS

(71) Applicant: Gundlach & Rattmann Consulting, LLC, Cottage Grove, WI (US)

(72) Inventors: Larry Chester Gundlach, Cottage Grove, WI (US); James Allen Rattmann, Windsor, CO (US)

(73) Assignee: Gundlach & Rattmann Consulting, LLC, Cottage Grove, WI (US)

(*) Notice: Subject to any disclaimer, the term of this patent is extended or adjusted under 35 U.S.C. 154(b) by 288 days.

(21) Appl. No.: 16/197,792

(22) Filed: Nov. 21, 2018

(65) Prior Publication Data

US 2019/0166855 A1    Jun. 6, 2019

Related U.S. Application Data

(60) Provisional application No. 62/594,343, filed on Dec. 4, 2017.

(51) Int. Cl.
*A22C 15/00*   (2006.01)

(52) U.S. Cl.
CPC .......... *A22C 15/007* (2013.01); *A22C 15/005* (2013.01)

(58) Field of Classification Search
CPC ..... A22C 15/00; A22C 15/007; A22C 15/005; A22C 15/003; A22C 17/02
USPC .......................................... 452/185–187, 193
See application file for complete search history.

(56) References Cited

U.S. PATENT DOCUMENTS

| | | | |
|---|---|---|---|
| 1,177,188 | A | 3/1916 | Keller |
| 1,572,178 | A | 2/1926 | Bermond |
| 1,745,013 | A | 1/1930 | Honohan |
| 1,866,508 | A | 7/1932 | Smith |
| 1,915,293 | A | 6/1933 | Covey |
| 1,967,870 | A * | 7/1934 | Covey .................. A22C 15/005 452/193 |
| 2,011,127 | A * | 8/1935 | Tait ...................... A22C 15/005 452/193 |
| 2,937,097 | A | 5/1960 | Draudt et al. |
| 4,172,305 | A | 10/1979 | Henebry et al. |
| 5,669,810 | A | 9/1997 | Ware et al. |
| 7,445,544 | B2 | 11/2008 | Niemiec |
| 7,607,973 | B1 * | 10/2009 | Beld .................... A22C 15/005 452/193 |
| 7,628,684 | B2 | 12/2009 | Jagusch |
| 9,386,780 | B2 * | 7/2016 | Soncini ............... A22C 15/005 |

(Continued)

FOREIGN PATENT DOCUMENTS

WO    2019/112807 A1    6/2019

OTHER PUBLICATIONS

International Search Report and Written Opinion for PCT/US2018/062220, dated Mar. 4, 2019, 13 pages.

(Continued)

*Primary Examiner* — Richard T Price, Jr.
(74) *Attorney, Agent, or Firm* — Smith Law Office; Jeffry W. Smith

(57) ABSTRACT

A meat processing device for defining a uniform shape of a pork belly, and including a frame, a shoulder defining a confinement space with the frame, and a tine for securing the meat in the confinement space. A cover may be joined to the frame to further define the confinement space, and may releasably engage the shoulder for a secure confinement of the pork belly.

26 Claims, 25 Drawing Sheets

(56) References Cited

U.S. PATENT DOCUMENTS

| | | |
|---|---|---|
| 2006/0099901 A1 | 5/2006 | Jagusch |
| 2006/0137537 A1 | 6/2006 | Christensen |
| 2006/0199488 A1* | 9/2006 | Niemiec ............... A22B 7/002 |
| | | 452/187 |
| 2019/0166855 A1* | 6/2019 | Gundlach ............ A22C 15/005 |
| 2019/0254295 A1* | 8/2019 | Gundlach ............ A22C 15/005 |

OTHER PUBLICATIONS

International Preliminary Report on Patentability for PCT/US2018/06220, dated Jun. 9, 2020, 7 pages.

* cited by examiner

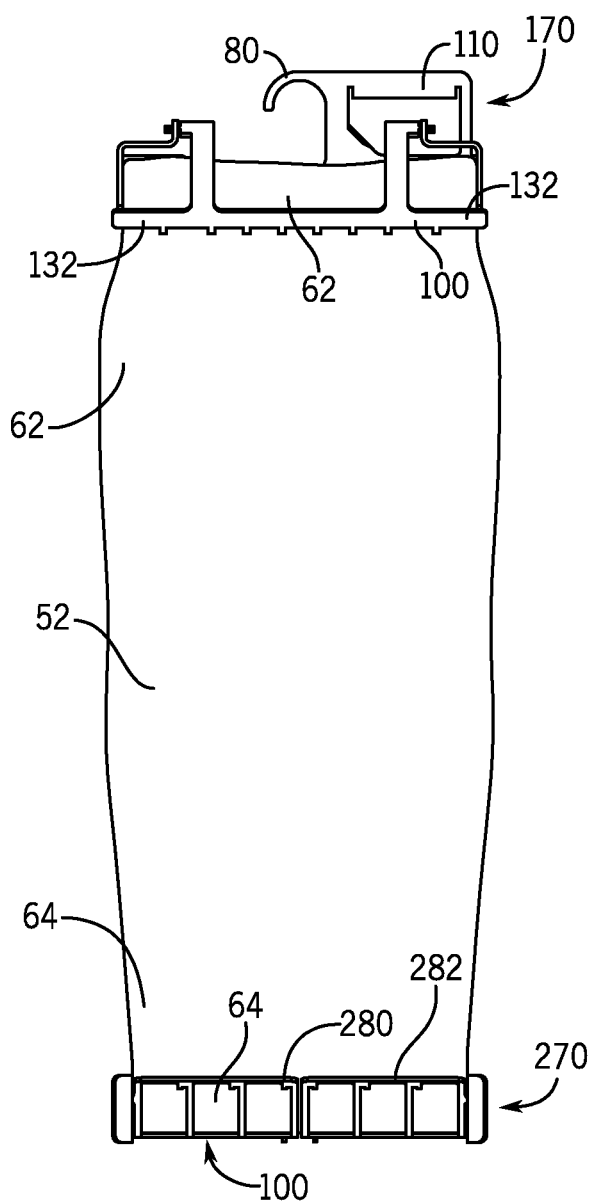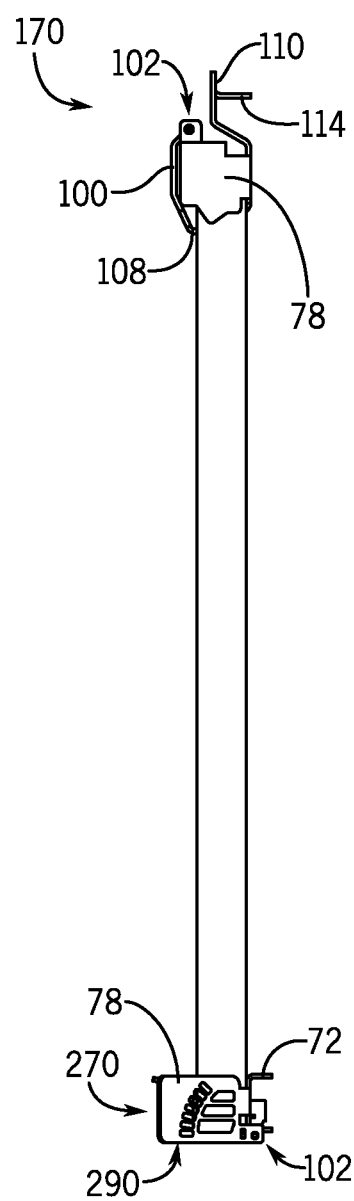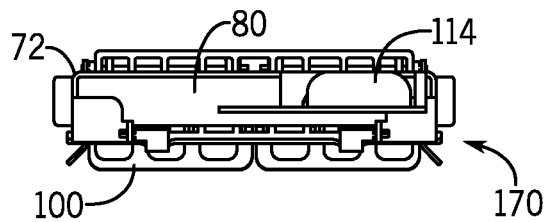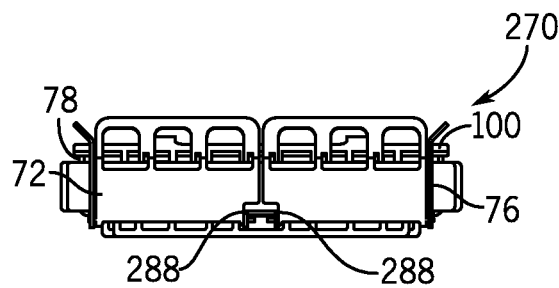
FIG. 13
FIG. 14
FIG. 15
FIG. 16

MEAT PROCESSING DEVICES TO CONTROL MEAT SLAB DIMENSIONS

CROSS REFERENCE TO RELATED APPLICATION

This application claims the benefit of U.S. Provisional Application No. 62/594,343, filed Dec. 4, 2017, the disclosure of which is incorporated by reference herein.

FIELD AND BACKGROUND OF THE INVENTION

The present invention relates generally to meat processing equipment, and more particularly to hanging hooks (commonly called "combs") and/or lower devices for securing pork bellies to be processed into bacon. Large volume bacon manufacturers convert pork bellies into slices of bacon suitable for food service or retail customers. One of their goals is to produce as many dimensionally uniform and unblemished slices as possible from pork bellies that have a wide variation in physical dimensions.

Steps in the processing of pork bellies into bacon usually include: 1) injecting a water solution usually containing salt, sugar, sodium phosphates, sodium ascorbate or sodium erythorbate, sodium nitrite and sometimes flavorings into the belly; 2) inserting a hanging hook or "comb" into one end of the injected belly and hanging the belly on a rack or trolley; 3) moving the rack or trolley into a smokehouse to heat and smoke the pork bellies; 4) chilling the processed pork; 5) removing the combs; 6) forming (or "pressing") the processed pork belly into a rectangular block or slab; and 7) slicing and packaging the bacon. Many pork producers try to impale the cutaneous trunci (CT) muscle of the pork belly on one or more tines of a comb to improve slicing yields.

Large bacon manufacturers use slicing equipment that can exceed 1000 slices per minute. To enable these speeds, the bacon slab is chilled to a temperature that generally ranges from 19° F. to 25° F. Temperatures in the upper part of this range should produce firm, but not solid slabs that are usually more suitable for both the pressing and slicing steps and which yield subsequently more high quality slices per slab than when pressing and slicing at higher or lower temperatures.

It is common to use a bacon slab pressing device after smoking to form the pork belly slab into a uniformly rectangular shape, so that the resulting slices are of uniform width and length. Uniform slices are desirable for both aesthetics and for packaging efficiency. Smoking, chilling and pressing pork bellies enables the bacon to be sliced into slices that land on a conveyor flat and that stay in uniform shingled or flat drafts (groups of shingled slices with a desired total weight or quantity for packaging) that can then be easily transferred to a packaging line. Pork belly slabs pressed at an overly warm temperature may not stay as a rectangular block, and the warm slices often stick to the slicer blade and land on the conveyor twisted, folded, and not flat. If the slices are too cold, they may land flat on the conveyor, but slide on the conveyor or each other, also resulting in a non-uniform draft. In either case the drafts are not acceptable for packaging without extra manual attention.

Pressing bacon into more uniform shapes requires the movement of bacon tissues. If the slabs are too cold, movement of the internal tissues may cause separation of the tissues. The greater the movement of those tissues during pressing, especially at colder temperatures, the more internal cracking, breaking and seam separation can occur in the resultant bacon slices. Previous recommendations using an ANCO bacon press were that the movement of tissues should not exceed 15% of the overall slab dimension. This 15% is routinely exceeded by most bacon producers because the width of the upper end of the raw belly is often much greater than 115% of the final dimensions.

Many of the above-described problems are the result of pork bellies stretching, folding, and otherwise forming into irregular shapes during the smoking/heating process while hanging on hangers/combs during the smoking process. Thus, there is a need for an improved pork belly hanging method and devices that minimize the excessive amount of dimension correction and tissue movement that causes internal cracking and/or seam separation and/or breaking during the pressing operation.

SUMMARY OF THE INVENTION

The present invention produces bacon slab dimensions suitable for slicing by controlling both the width and thickness of both the top/flank end and the bottom/brisket end of the hanging belly during the smoking and heating process to better conform to the desired slice dimensions needed in the finished package while minimizing damage to the slab and slices. The bottom/brisket end of the hanging belly has the end formed flat or nearly flat, so that slicing will result in higher first quality bacon slicing yields. If it is flat or nearly flat, the first or second slice should be acceptable for packaging. By maintaining the width of the top/flank end, it has been found that gravity and heat during the smoking/heating process result in a more uniform belly width from the top to the bottom of the pork belly, which results in less tissue movement and damage during pressing and resulting in higher yields. Pork bellies hung with the present invention become narrower and more dimensionally uniform after processing than those hung with conventional methods. This means bellies can be hung closer together on trolleys during the smoking operation, thus increasing the number of bellies on a trolley. This results in a significant increase in processing capacity.

Meat processing devices in accordance with the present invention, can be used on the top and/or the bottom of both ends of a pork belly. A top meat processing device has a hook for hanging on a trolley and a bottom meat processing device need not have a hook. The bottom meat processing device preferably includes a locking mechanism to maintain a cover in a closed position, but a locking mechanism is not typically necessary on a top meat processing device, although a locking device could be used.

A meat processing device for the top or the bottom of a pork belly in accordance with the present invention includes a frame having a first end portion and a second end portion; a shoulder joined to the first end portion of the frame to at least partially define a confinement space with the frame; and a frame tine joined to and extending outwardly from the frame and into the confinement space. The meat processing device can include a second frame tine joined to and extending outwardly from the frame and into the confinement space. The meat processing device can also include a second shoulder joined to the second end portion of the frame to at least partially define the confinement space with the frame and the shoulder.

The meat processing device can further include a cover joined to the frame to at least partially define the confinement space. The cover can be fixed or hinged to the frame to pivot between an open position and a closed position to at least partially define the confinement space, and include a cover tine joined to the cover and extending toward the frame.

The cover can include a first portion hinged to the frame for movement between an open position and a closed position, and a second portion disposed at an angle to the first portion, and spaced apart from the frame in the closed position to at least partially define the confinement space. This embodiment is preferred for a bottom meat processing device.

The meat processing device when used on the top of a pork belly can also include a hanging hook joined to the frame for hanging the device on a rack or a trolley.

The meat processing device frame can have a central portion between the first portion and the second portion; and at least a portion of the shoulder extends toward the central portion to define a tapered confinement space.

The meat processing device cover can also be releasably engaged to the shoulder when in the closed position, and the cover can include a shoulder lock component on the shoulder for releasably engaging a cover lock component in the closed position. The shoulder can include a number of shoulder lock components that can be selected for engagement with the cover lock component on the cover.

An upper or top meat processing device can be used with a second or lower meat processing device having a second frame having a first end portion and a second end portion; a frame tine joined to and extending outwardly from the second frame between the first end portion and the second end portion; and a shoulder joined to the first end portion of the second frame to at least partially define a confinement space with the second frame.

The lower meat processing device can further include two or more covers hinged to the frame to pivot between open positions and closed positions to at least partially define the confinement space.

Further features and benefits of the present invention are included in the detailed description below.

BRIEF DESCRIPTION OF THE DRAWINGS

FIG. 13 is a front view of a meat processing device for the top of a pork belly and a meat processing device for the bottom end of a pork belly, attached to a pork belly in accordance with the present invention;

FIG. 14 is a side view of the top and bottom meat processing devices of FIG. 13 attached to a pork belly;

FIG. 15 is a top view of the top meat processing device of FIG. 13;

FIG. 16 is a bottom view of the bottom meat processing device of FIG. 13;

DETAILED DESCRIPTION OF THE INVENTION

Figure 1:
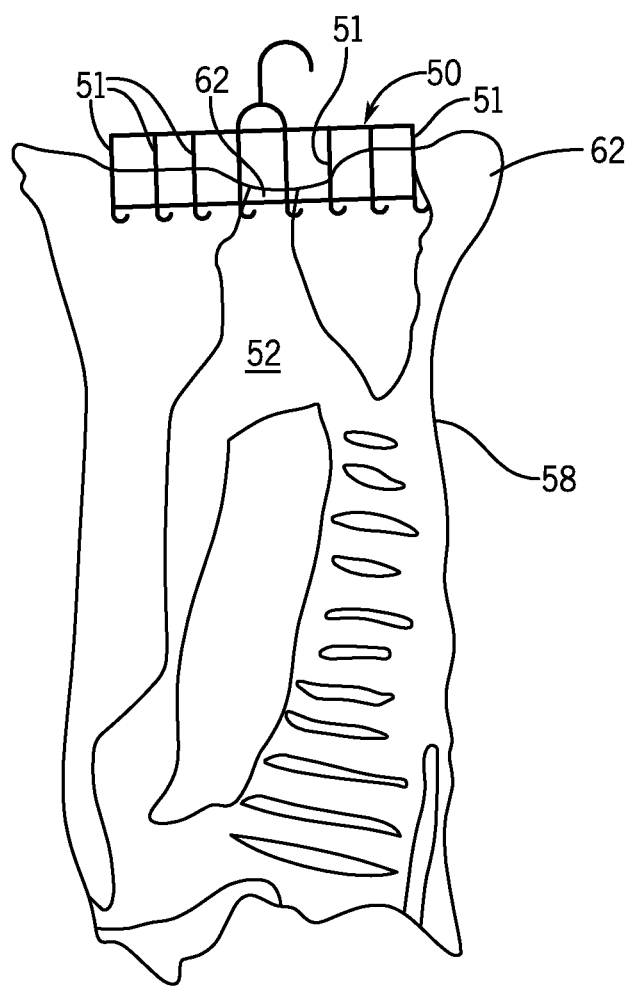
FIG. 1 is a front view of a pork belly hanging on a conventional 9" bacon comb.

In the following detailed description of the invention, the same reference numerals will be used for the same or similar components being described in each of the drawings. Also, the present invention is most suitable for processing pork bellies into pork slabs for being sliced into bacon, but the present invention can be used to process other cuts and types of meat, as well.

Figure 2A:
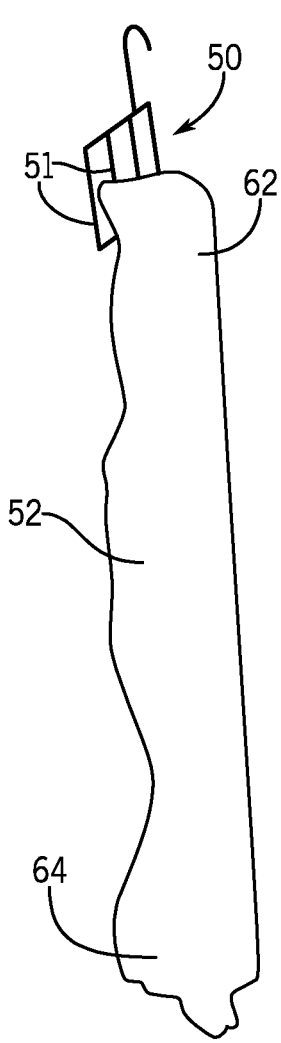
FIG. 2A is a side view of a pork belly hanging on a conventional 9" bacon comb.
Figure 2B:
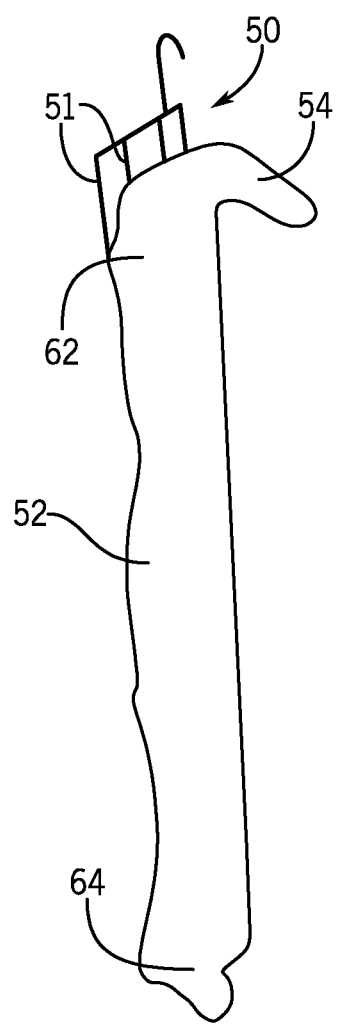
FIGS. 2B and 2C show side view depictions of pork bellies hanging on conventional 9" bacon combs with various meat defects.
Figure 2C:
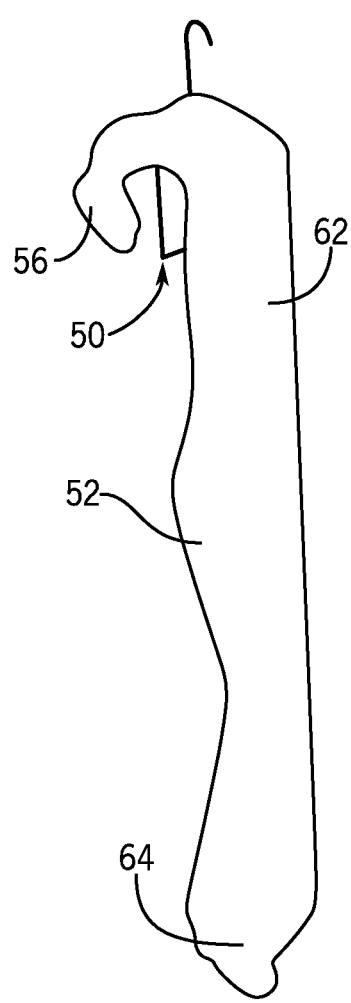
Figure 3:
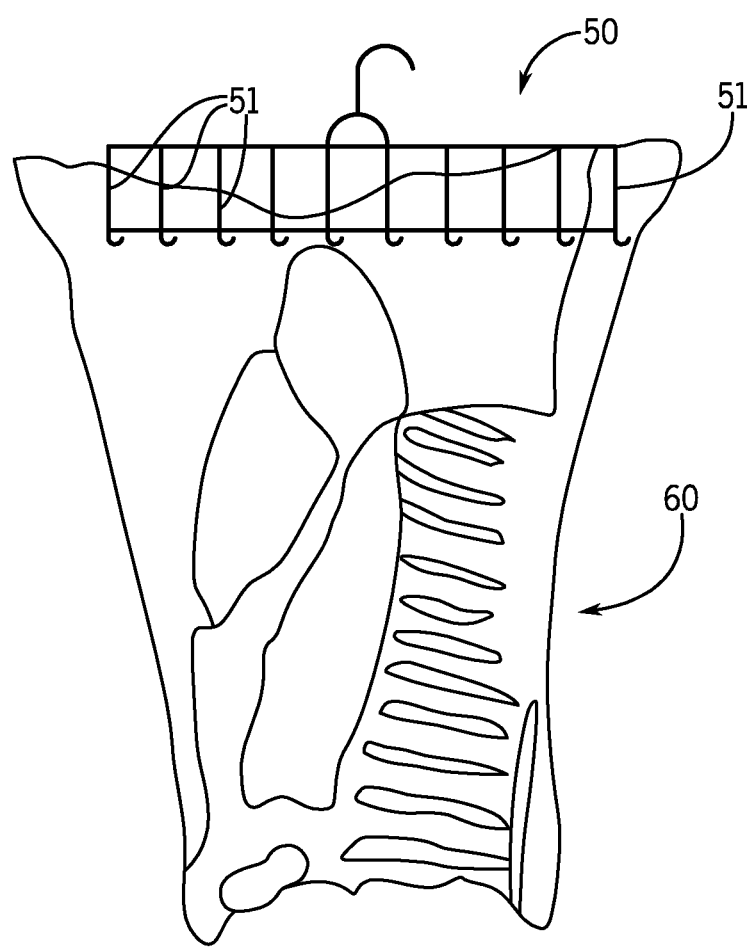
FIG. 3 is a front view of a bacon belly hanging on a conventional 12" bacon comb.

Prior meat processing devices are depicted in FIGS. 1 through 3 as a pork belly hanger 50 or "comb." The comb 50 includes tines 51 that are inserted into a pork belly 52, then hung on a rack or trolley for a smoking process. Many sizes of hangers 50 or bacon combs are used in the bacon industry, including 9-inch and 12-inch bacon combs. With the shorter (9-inch) combs, there often is a much wider part of the pork belly on either side of the end of the comb 50, as compared to the wider (12-inch comb). Bellies are usually about 13-inches wide but are often as much as 17-inches wide, which is wider than even the widest comb 50. When the pork belly is wider than the hanger 50, either a fat side fold over 54, as seen in FIG. 2B or a lean side fold over 56, as seen in FIG. 2C.

Belly foldovers 54 and 56 are less likely to occur when the comb is inserted within ½ inch to 1 inch from the end of the pork belly 52, as seen in FIG. 2A. Since most meat processing companies expect employees to insert the hanger/combs at a very fast rate, the combs 50 are often inserted farther away from the end of the pork belly 52, which can cause foldovers 54 (FIG. 2B) and 56 (FIG. 2C.) Further, during the time from injection to the end of the smokehouse processing, the weight of the pork belly 52 on the comb 50 causes the pork belly to stretch and narrow, as seen in the stretched portion 58 in FIG. 1. However, the top/flank end or "upper portion" 62 of the pork belly 52 will not stretch/narrow because the tines/hooks of the comb keep that upper portion 62 dimensionally stable. Immediately after hanging, gravity begins stretching and narrowing the belly 52. This continues during the heating/smoking process. Eventually with higher temperatures, the final dimensions, by partially denaturing the protein, are fixed. Subsequent chilling brings the slab to a nearly frozen and nearly inelastic semi-solid state.

Using wider combs 50 can limit foldovers 54 and 56, but may detrimentally result in wedge-shaped pork bellies 60, as seen in FIG. 3. The combination of using wide combs 50 and less than optimal placement of the comb tines 51 into the pork belly 52 aggravates issues inherent with bacon pressing because pork bellies 52 smoked/heated and chilled with combs 50 placed as seen in the examples in FIGS. 2B and 2C, and FIG. 3 will become mostly inelastic during these processes. Due to the high forces compressing the belly in the press, these slabs may be damaged and may produce damaged slices. Removing damaged slices that fail to make the grade reduces slicing yields. Also, many slices that are not acceptable for packaging may be unintentionally packaged as first quality product because unacceptable slices in a draft may be covered by good slices, resulting in consumer dissatisfaction. In short, damaged slices reduce yield, quality, or both.

The present invention produces a higher percentage of first quality slices per slab after smoking/heating, chilling, and slicing. This invention includes a system for better controlling the key dimensions of the pork belly 52, throughout the processing steps from injection through chilling and to the point of slicing, so that slabs will require minimal dimensional changes in the bacon slab pressing device.

Figure 4:
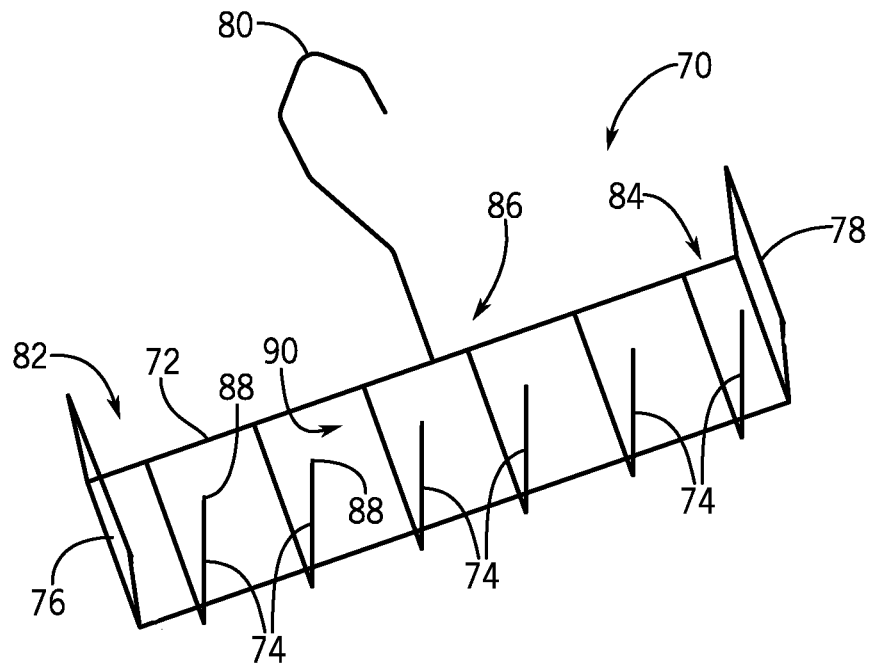
FIG. 4 shows a meat processing device defining a confinement space to achieve a substantially constant pork slab width in accordance with the present invention.

FIG. 4 depicts a basic embodiment of the present invention of a meat processing device 70 having a frame 72, a number of frame tines 74, a first shoulder 76, a second shoulder 78, and a hanging hook 80. The frame 72 includes a first end portion 82 to which the first shoulder 76 is joined, a second end portion 84 to which the second shoulder 78 is joined, and a central portion 86 between the first end portion 82 and the second end portion 84. In the illustrated embodiments, the meat processing devices are used to secure pork bellies 52 during smoking/heating and/or chilling processes.

The frame 72 and other components can be made of any suitable material such as stainless steel, and be shaped in any suitable manner such as bent and welded wire, formed or laser-cut plate material, or machined plate, or any combination of these, as examples. The basic embodiment depicted in FIG. 4 is made from welded wire, but machined and formed plate versions are described below. The welded wire embodiment depicted in FIG. 4 has the frame 72, the frame tines 74, the first shoulder 76, and the second shoulder 78 all joined together and formed by bending some of the welded wires to the desired shapes.

In the illustrated embodiments, the first shoulder 76 is joined to the most distal end of the first end portion 82, but the first shoulder 76 could be joined inwardly from the distal end of the frame 72 or even have another component disposed between the first end portion 82 of the frame 72 and the first shoulder 76 depending upon the desired dimensions. Similarly, the second shoulder 78 and the second end portion 84 could be joined together in these various ways.

The meat processing device 70 is shaped so the pork belly 52 is positioned at the center portion 86 where there are preferably a number of frame tines 74 to impale or partially impale the cutaneous truncii muscle, which is preferably positioned directly above the frame tines 74. In this embodiment of a meat processing device 70, the first shoulder 76 and the second shoulder 78 are arranged at right angles to the frame 72. Each side of the pork belly 52 that would otherwise extend beyond the first portion 82 and the second portion 84 of the frame 72 is instead compressed by the respective shoulder 76/78, so the pork belly 52 fits in the confinement space 90 between the first shoulder 76 and the second shoulder 78 of the meat processing device 70.

The frame tines 74 are also depicted as being wires bent to a desired shape and a slightly upward orientation with sharpened end portions 88. Any desired number of frame tines 74 can be used, so long as the pork belly 52 is secured in the device 70. Also, the frame tines 74 can any shape, width, material, or have any feature that secures a pork belly 52 to the meat processing devices within the scope of the present invention. The frame tines 74 need not pierce the pork belly 52, but piercing is preferred, especially when the pork belly 52 is hanging from the meat processing device. In the embodiments where the meat processing device is at the bottom and hanging from the pork belly 52, piercing may not be necessary. Further, it is possible with the present invention to use only one frame tine 74, especially one that extends laterally to engage the meat in a uniform position.

The frame 72 and at least one of the first shoulder 76 or the second shoulder 78, or both, cooperate to define a confinement space 90 in which an end portion of a pork belly 52 is secured to the frame tines 74, but limited by the shoulder 76/78 from extending outwardly from the confinement space 90 during heating, smoking, and chilling processes. Preferably, both the first shoulder 76 and the second shoulder 78 are used to define the confinement space 90, but only one or the other may be used in some embodiments.

Maintaining an end of the pork belly 52 in the confinement space 90 and secured to the frame 72 reduces the amount of foldover 54/56 (see FIGS. 2B and 2C), stretched portions 58 (FIG. 1), and wedge-shaped bellies 60 (FIG. 3) by maintaining the dimensions of the pork belly 52 during processing when the pork belly 52 loses its elasticity in the smokehouse. Further, controlling the width of the pork belly 52 while it is still pliant using the frame 72 and shoulder 76 combination, enables workers to secure the pork bellies 52 to the meat processing device 70 quickly in a uniform and predetermined position, which enables racks of pork bellies 52 to be uniformly hung and treated, as described in more detail below.

Figure 5:
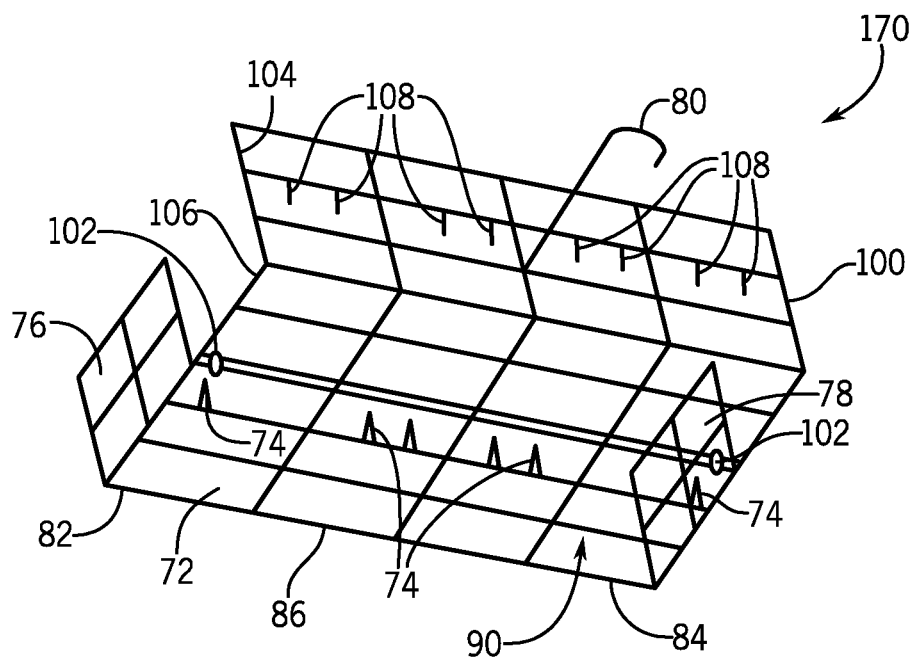
FIG. 5 is a perspective view of an alternate meat processing device with a cover for an upper end of a pork belly in accordance with the present invention.
Figure 39:
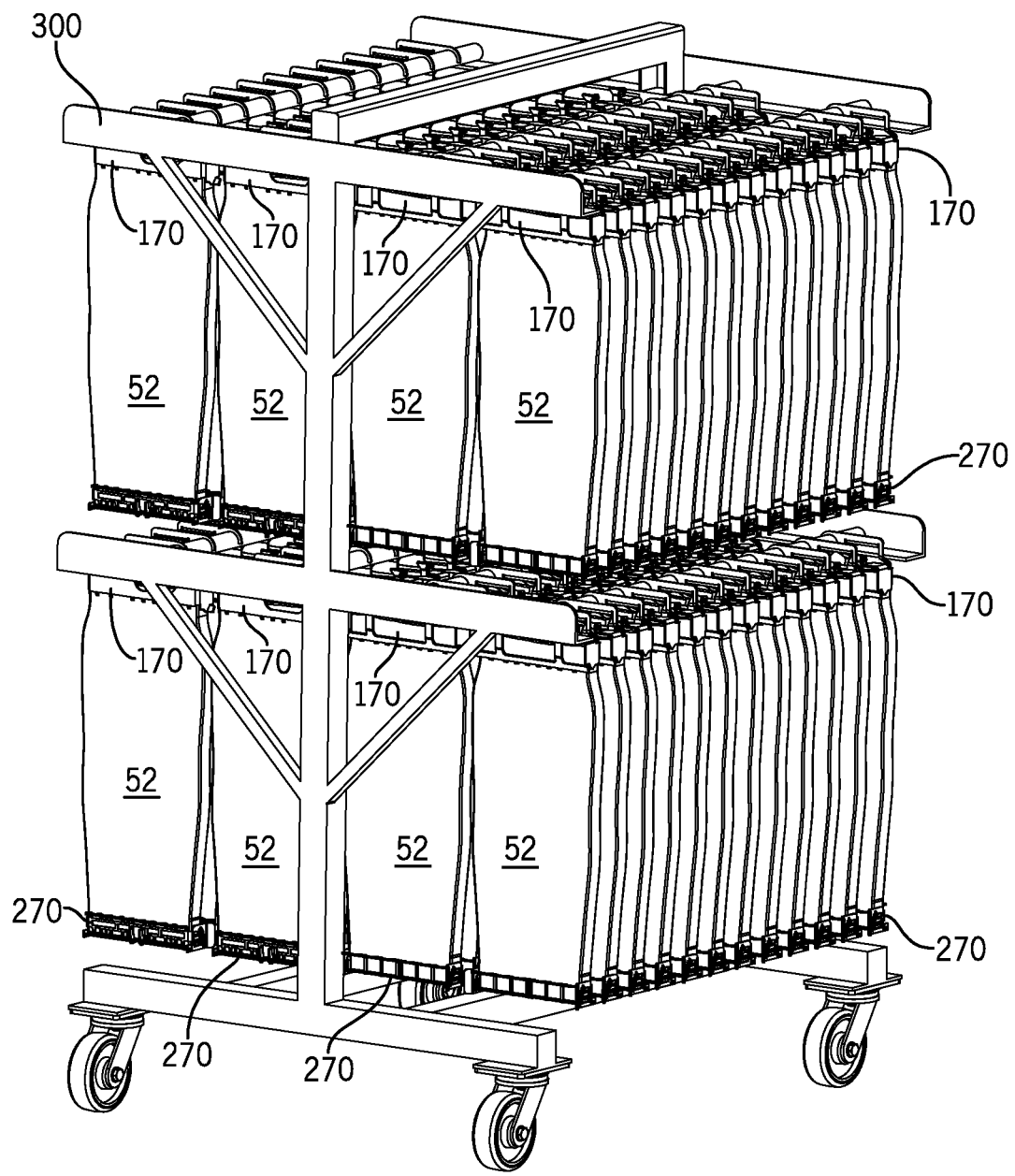
FIG. 39 is an upper right front view of a trolley and meat processing system in accordance with the present invention.

Another embodiment of meat processing device 170 to control the shape of the top end of the pork belly 52 is illustrated in FIG. 5. This meat processing device 170 is used to control the top end of the pork belly 52, and to be hung from a rack or trolley (see: FIG. 39, for example.)

The meat processing device 170 of FIG. 5 (as compared to the meat processing device 70 of FIG. 4) preferably further includes a cover 100 hinged to the frame 70 at a hinge 102 or in any suitable manner, so that the cover 100 can move between an open position (FIG. 5) and a closed position to further define at least a portion of the confinement space 90. The cover 100 is joined to the frame 72 at a hinge 102, and the cover 100 includes a first portion 104 and a second portion 106. The cover 100 can be any suitable shape, but is preferably bent into two planes so that it creates a three-dimensional confinement space 90 with the frame 72 and one or both shoulders 76 or 78. Further, a hanging hook 80 can be used, and joined to the cover 100.

With the cover 100 in the open position (FIG. 5), the CT muscle of the pork belly 52 is pushed onto the frame tines 74, which are illustrated as straight, but could be angled relative to the frame 72, curved, or any other shape. Each side of the upper flank end of the pork belly 52 is compressed to fit into the confined space 90 between the shoulders 76/78 and onto the frame tines 74. The cover 100 is then pivoted to the closed position to further secure the pork belly 52 in the confinement space 90. The cover 100 preferably includes cover tines 108. The cover tines 108 prevent surface muscles from folding forward or sliding down during smoking/heating. The cover tines 108 can be in the form of any of the options described herein related to the frame tines 74.

The cover 100 is pushed closed to bring cover tines 108 to further impale or otherwise entrap the pork belly 52 with the frame tines 74. This opposing tine arrangement holds the pork belly 52 in place to eliminate the "foldovers" shown in FIGS. 2B and 2C. The opposing frame tines 74 and cover tines 108 can be angled so that they are oriented slightly upwardly when the pork belly 52 is hung to reduce the chance that the pork belly 52 can drop out of the meat processing device 170, and so that the muscles on the surface of the lean side can not slide downward when hung and heated.

The cover 100 is illustrated as being joined to the frame 72 with a hinge 102, but the cover 100 could be a separate component that detaches from the frame 72 for convenience and hygiene purposes. Rather than pivoting into a closed position, a separate cover 100 could simply snap into place or be attached using a connector to define the confinement space 90. Other cover 100-to-frame 72 attachment mechanisms are also possible, including a hinge on the side of the frame 72 or one of the shoulders 76 and 78. The cover 100 could also slide into engagement with the frame 72 using slots or recesses with mating tabs or flanges. Various types of tools and fixtures can also be used to position the various components and/or the meat to enable easier and quicker attachment of the meat to the meat processing devices 170 and/or 270.

The finished width of the pork belly 52 is recommended to be in the range of nine to ten inches because package sizes for sliced bacon are normally in that range. Some bacon is made from smaller bellies that result in slices as short as six inches and packaged as center cut bacon. The meat processing device 170 and others within the scope of this invention could be dimensioned to correspond to any desired size of pork bellies 52 or bacon size.

Figure 6:
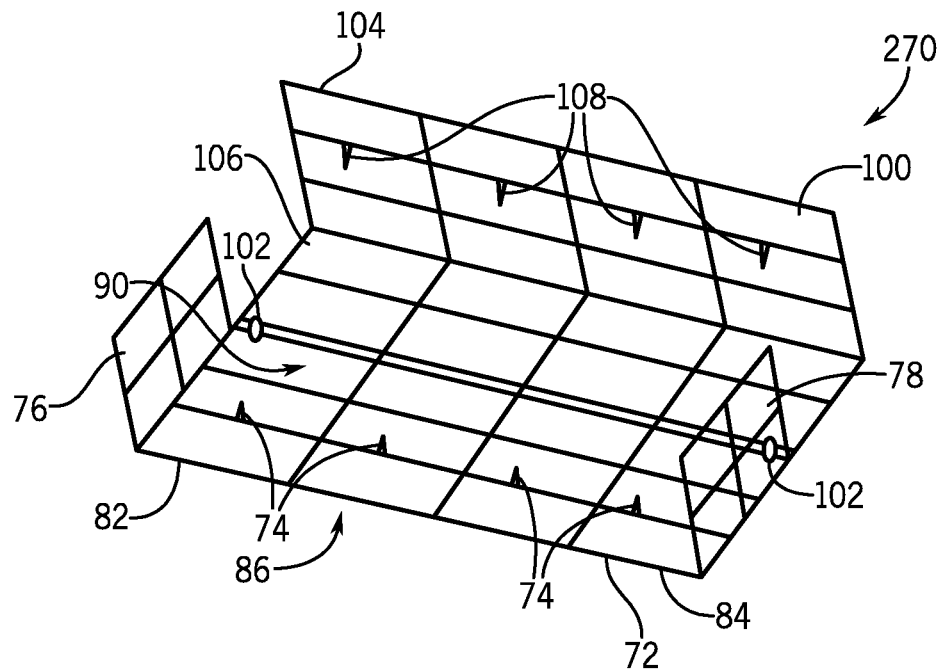
FIG. 6 is a perspective view of a meat processing device with a cover for a lower end of a pork belly in accordance with the present invention.

The meat processing device 270 of FIG. 6 does not include a hook and is used at the bottom of the pork belly 52, but is otherwise similar to the meat processing device 170 of FIG. 5. Not as many tines are necessary in this embodiment because the meat processing device 270 does not support the weight of the pork belly 52.

Figure 7:
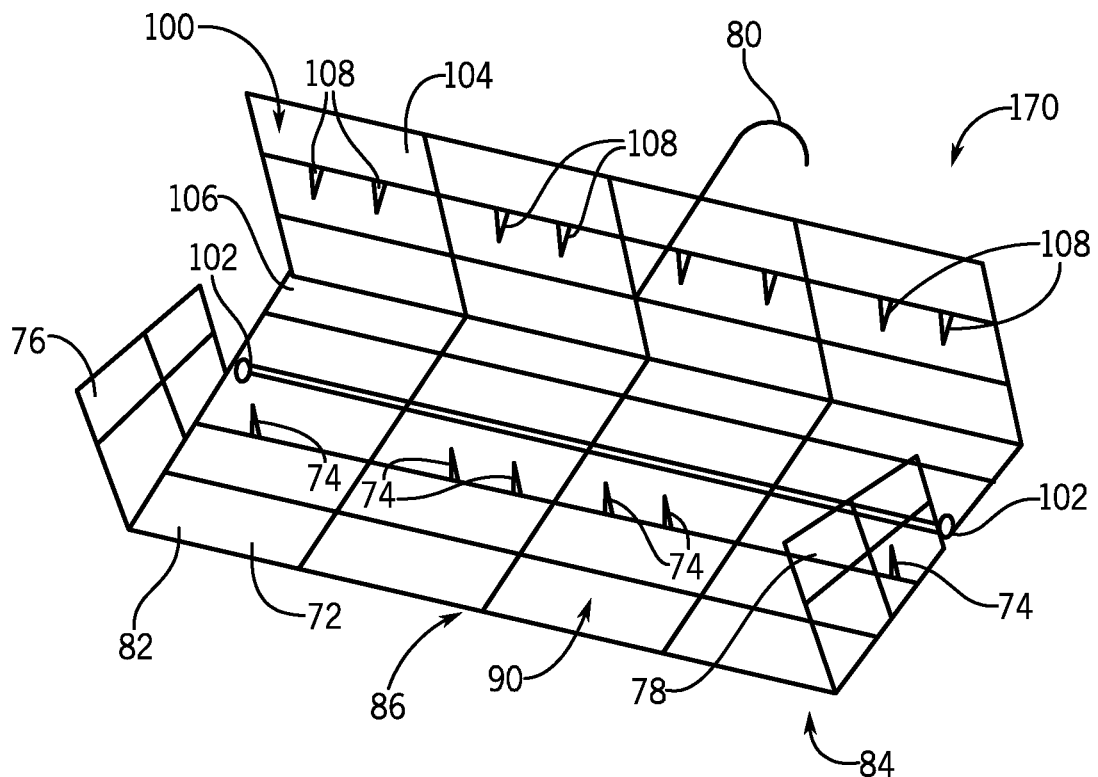
FIG. 7 is a perspective view of an alternate meat processing device with a cover, in accordance with the present invention.

The meat processing device of FIG. 7 is essentially the same as the embodiment of FIG. 5, except that the first shoulder 76 and the second shoulder 78 are tapered. With this shape of shoulders 76/78, the resulting confinement space 90 will be tapered, as well, when the cover 100 is closed.

Typically, about the last one inch of a pork belly 52 slab cannot be sliced into acceptable slices because the slicing machine mechanism usually loses control of the pork belly 52 slab when slicing reaches this point. Also, there are usually comb tine holes in this area of the pork belly 52 slab, which are very undesirable to the consumer. The embodiment illustrated in FIG. 7 reduces the amount of the loss encountered at the trailing end of the bacon slab during slicing by reducing the thickness of the slab during the last two inches of the trailing or flank end of the bacon slab. This is accomplished by angling one or both shoulders 76/78 relative to the frame 72 to change or taper the shape of the resulting confinement space 90. Preferably, a taper of about 1⅝ inches at the bottom to about 1 inch at the top end of the device is suitable, but other taper angles can be used.

Figure 8:
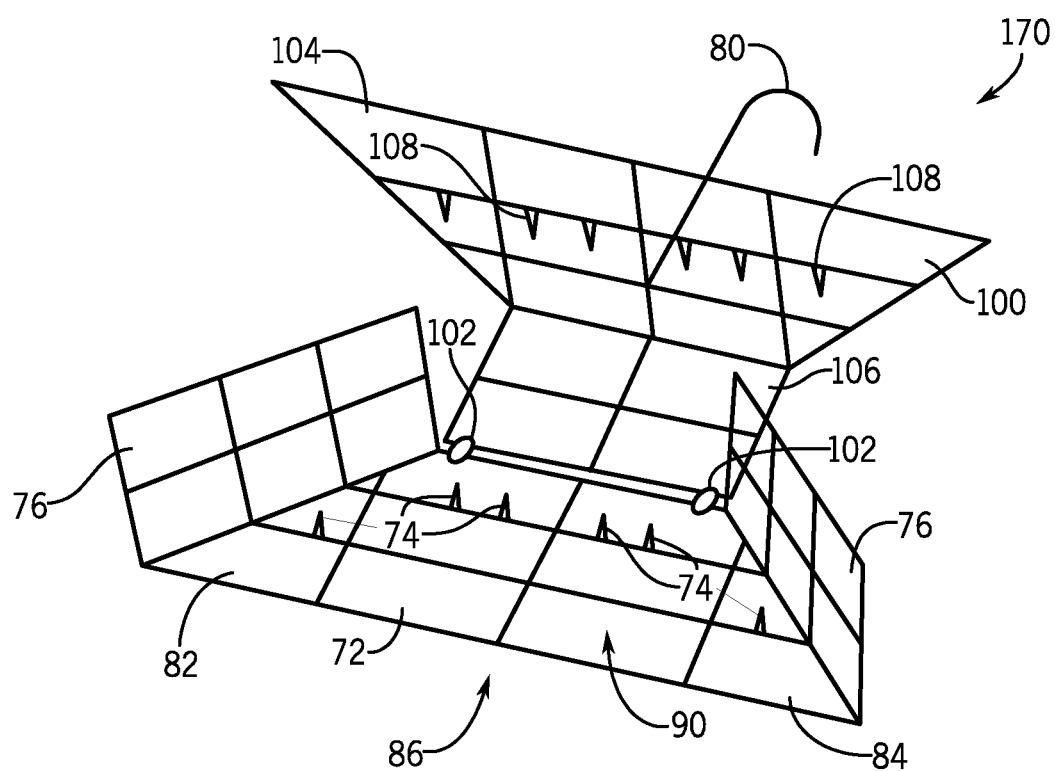
FIG. 8 is a perspective view of an alternate meat processing device with a cover, in accordance with the present invention.

Another embodiment of a top meat processing device 170 is illustrated in FIG. 8 to progressively narrow the width of the pork belly 52 slab for about the last two inches of the trailing end which is the flank end 24 of the pork belly 52 slab. This is accomplished by angling the shoulders 76/78 relative to the frame 72 so the meat processing device 170 tapers from approximately 9½ inches wide to approximately six inches wide. This tapered confinement space 90 reduces the volume of the end of slab lost and thereby increases the percentage of the total useable weight of the pork belly 52 slab.

Figure 9:
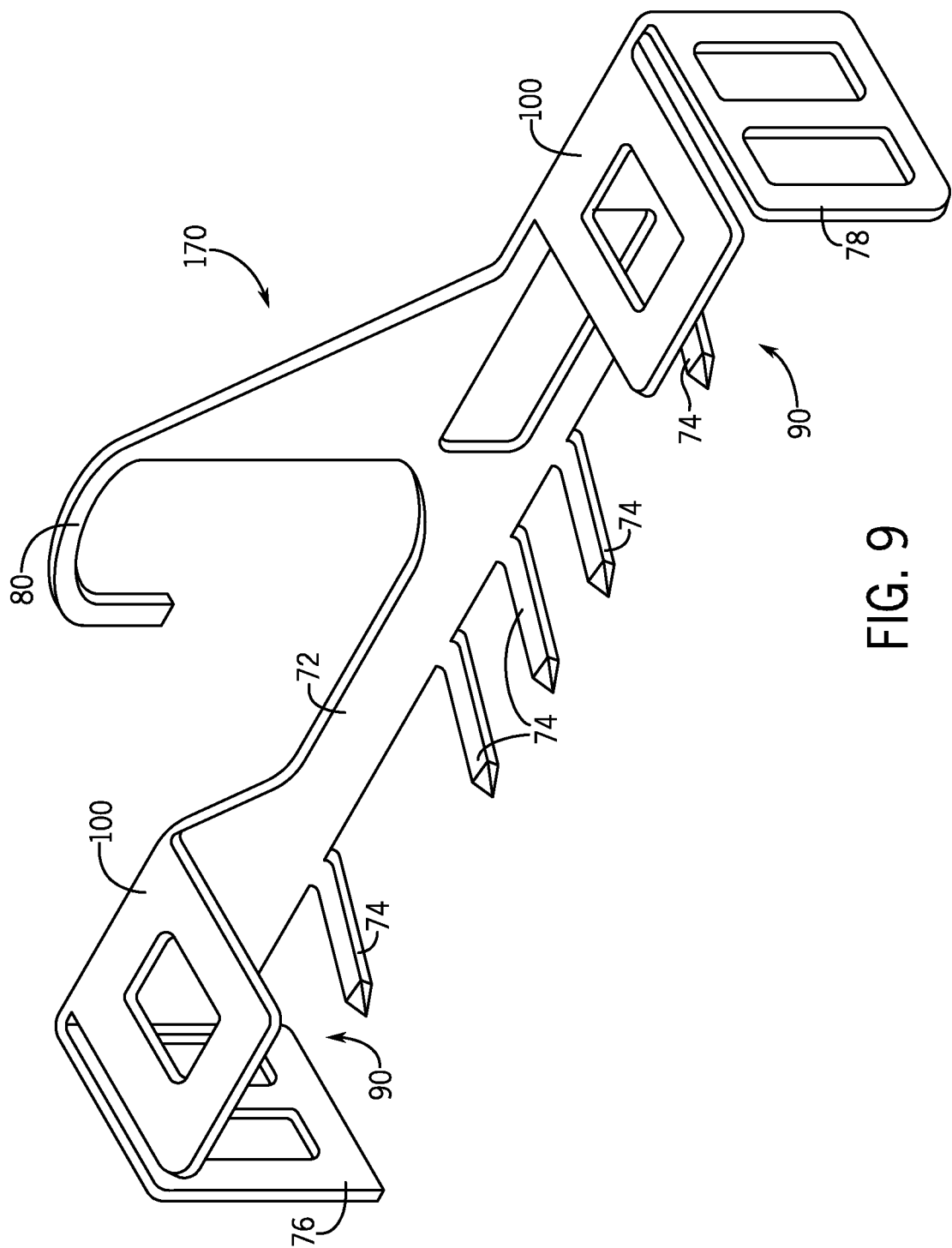
FIG. 9 is a perspective view of an alternate meat processing device with a cover, in accordance with the present invention.

FIG. 9 is directed to a meat processing device 170 having a frame 72, frame tines 74, a first shoulder 76, a second shoulder 78, and a hook 80. In addition, the embodiment of FIG. 9 includes a fixed cover 100 that defines a top to the confinement space 90. This arrangement limits the position of the top of the pork belly 52 to the cover 100 position. This arrangement reduces the amount of waste by maintaining the frame tine 74 engagement of the pork belly 52 to any desired dimension, but preferably to less than one inch.

Figure 10:
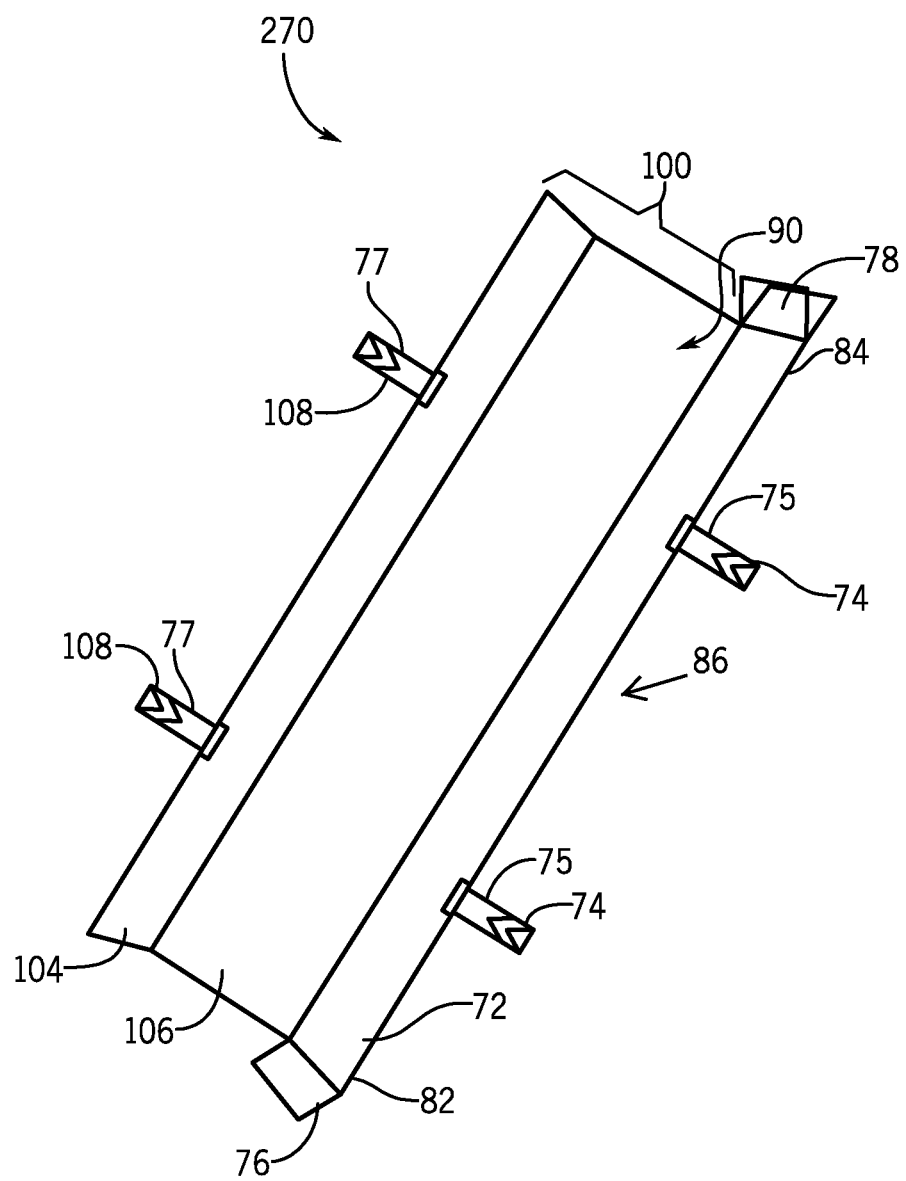
FIG. 10 is a perspective view of an alternate meat processing device with a cover, in accordance with the present invention.

The brisket end 64 of the pork belly 52 is preferably enclosed in device 270 of FIGS. 6, 10 and 11, and 28 to 38 if desired, so the pork belly lower end 55 is shaped flat during the smokehouse processing procedure. One embodiment of such a meat processing device 270 in accordance with the present invention is illustrated in FIG. 10 and is attached to the lower portion 64 (usually the brisket end) of the pork belly 52 to put pressure against the muscles in this location so that they remain flat against the bottom 106 of the meat processing device 270. Normally, the cut muscles at the bottom/brisket portion 64 stretch to different lengths resulting in a very uneven end of the pork belly 52. The pressing machine (not illustrated) procedure attempts to eliminate this end loss, but is only partially successful. The meat processing device 270 of FIG. 10 includes a frame 72, optional shoulders 76 and 78, a bottom portion 106 hinged to the frame 72, and a cover 104 hinged to the bottom portion 106. In this embodiment, the frame tines 74 are attached to straps 75, which are joined to the frame 72. Another set of straps 77 with tines 108 can be used as well.

Figure 11:
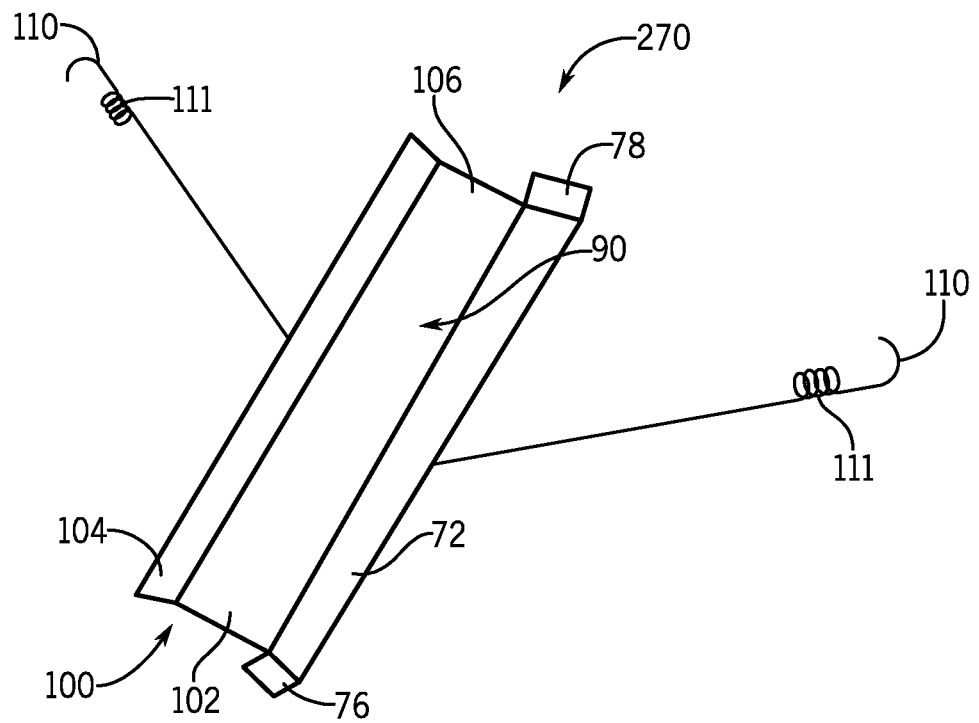
FIG. 11 is a perspective view of an alternate meat processing device with a cover, in accordance with the present invention.
Figure 12:
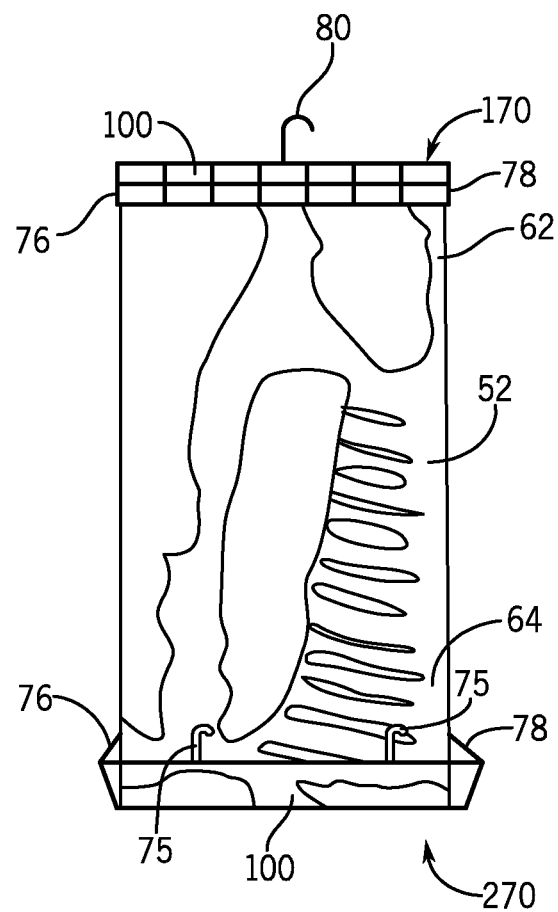
FIG. 12 is a front view of a meat processing device for the top of a pork belly and a meat processing device for the bottom end of a pork belly, attached to a pork belly in accordance with the present invention.
Figure 18:
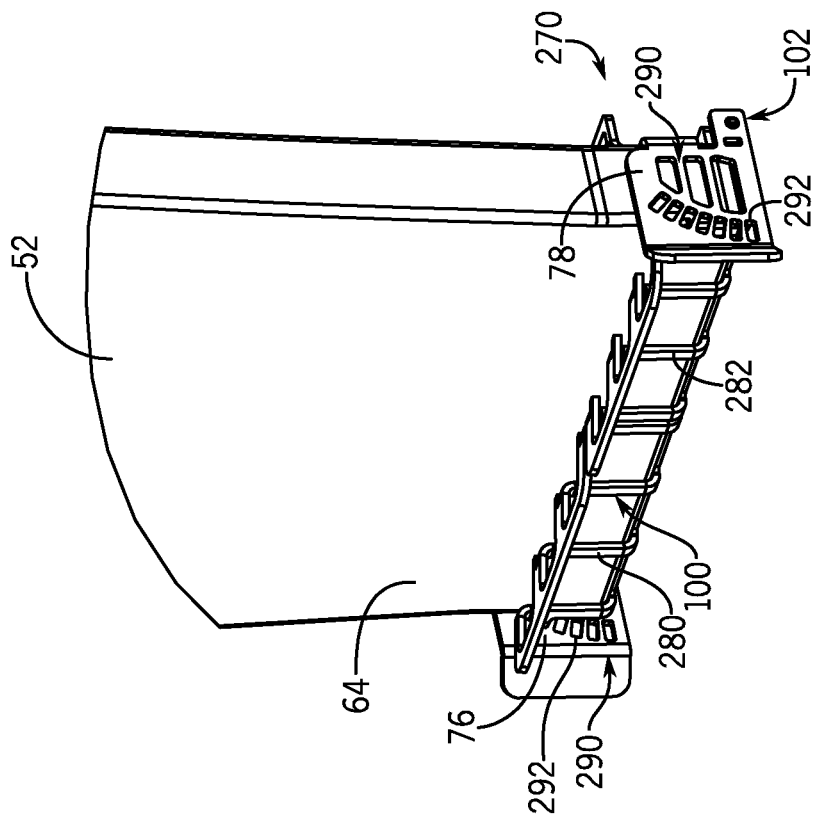
FIG. 18 is a perspective view of the bottom meat processing device of FIG. 13 and joined to a pork belly.
Figure 17:
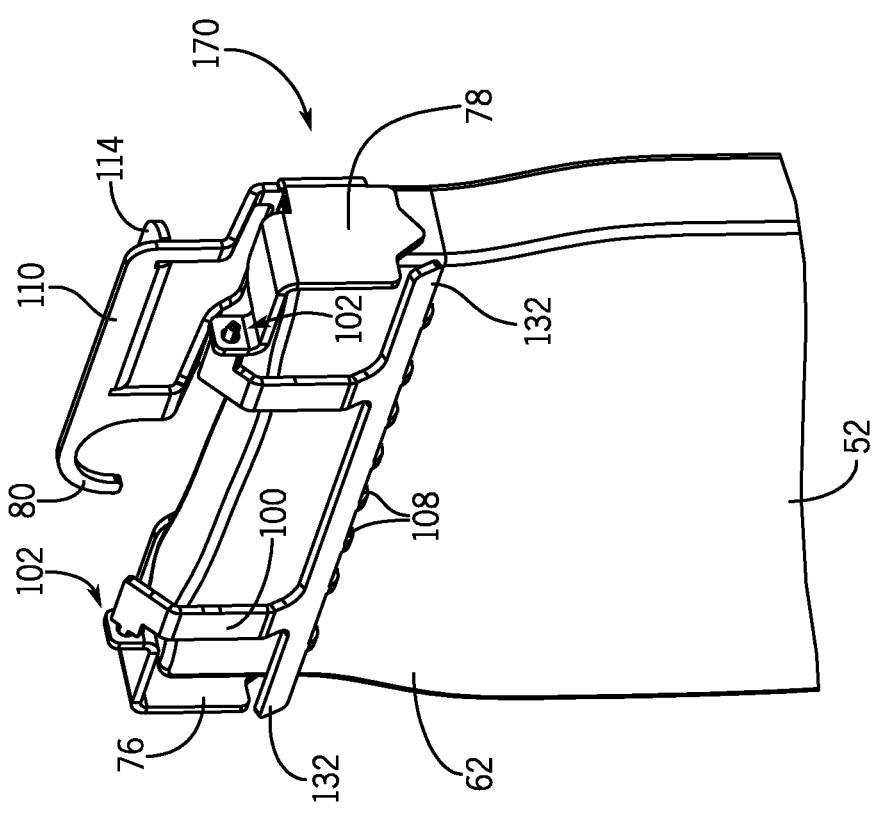
FIG. 17 is a perspective view of the top meat processing device of FIG. 13 and joined to a pork belly.
Figure 19:
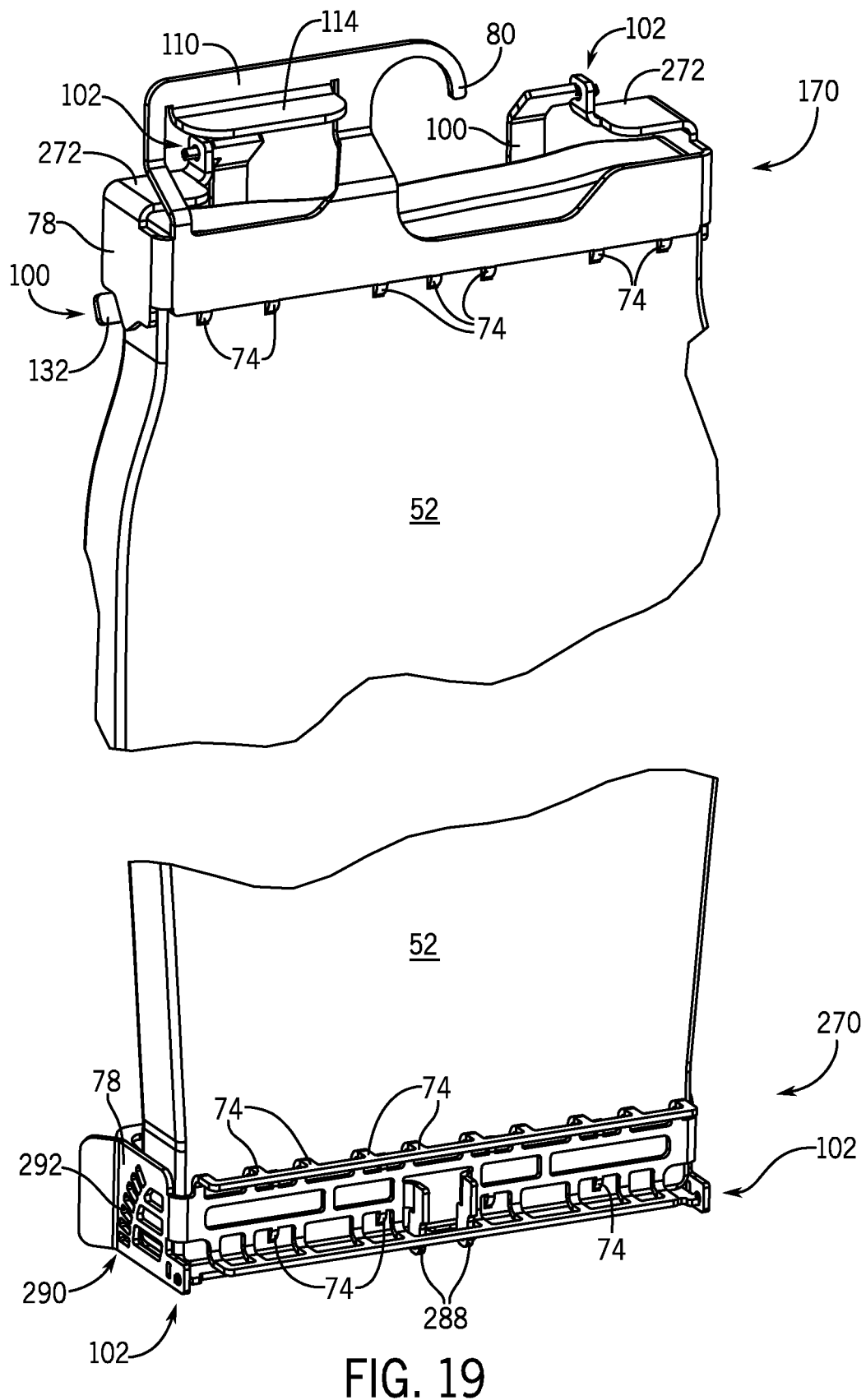
FIG. 19 is another perspective view of the top and bottom meat processing devices of FIG. 13 and joined to a pork belly.
Figure 20:
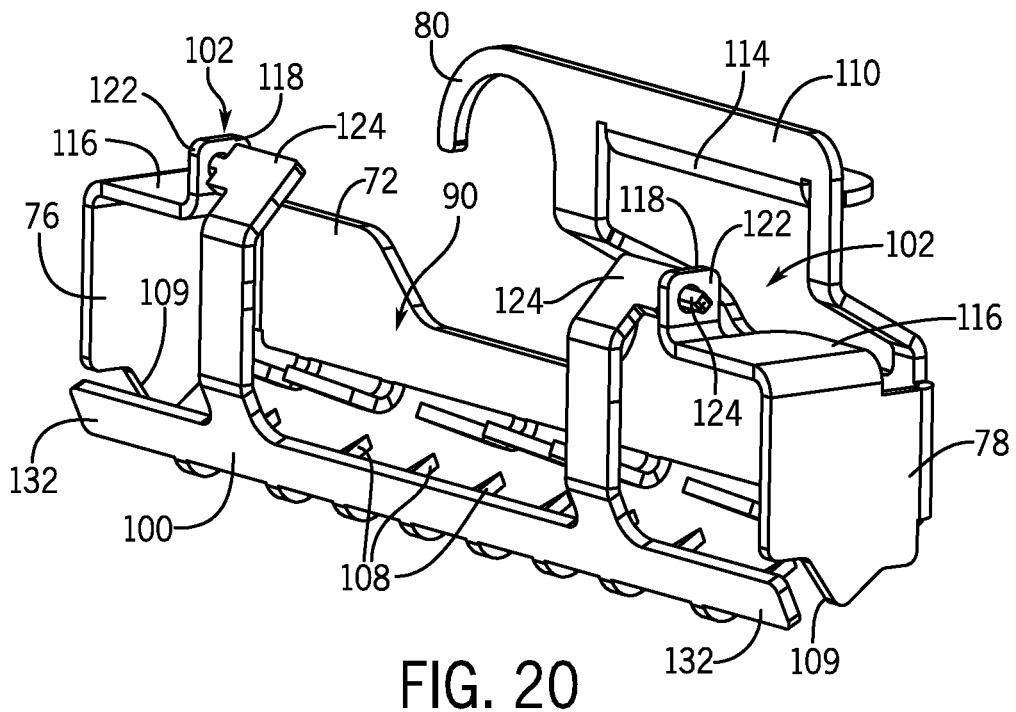
FIG. 20 is a perspective view from the front upper right of a top meat processing device in accordance with the present invention.
Figure 21:
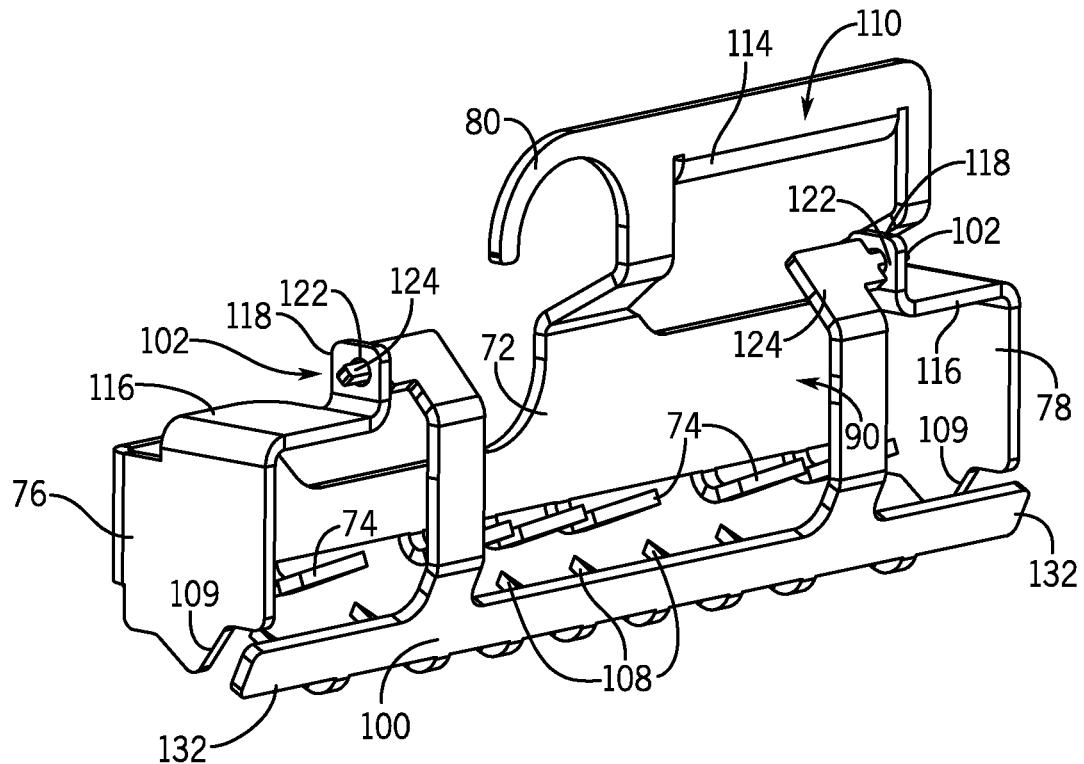
FIG. 21 is a perspective view from the front upper left of a top meat processing device in accordance with the present invention.
Figure 22:
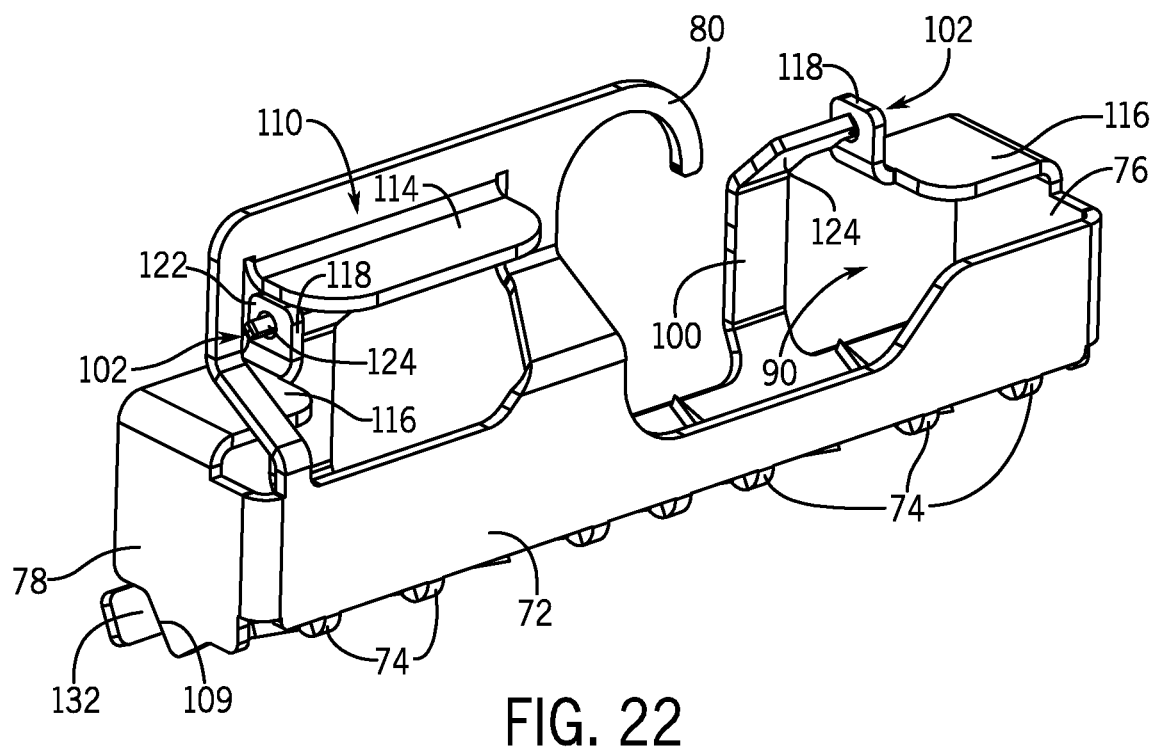
FIG. 22 is a perspective view from the rear upper left of a top meat processing device in accordance with the present invention.
Figure 23:
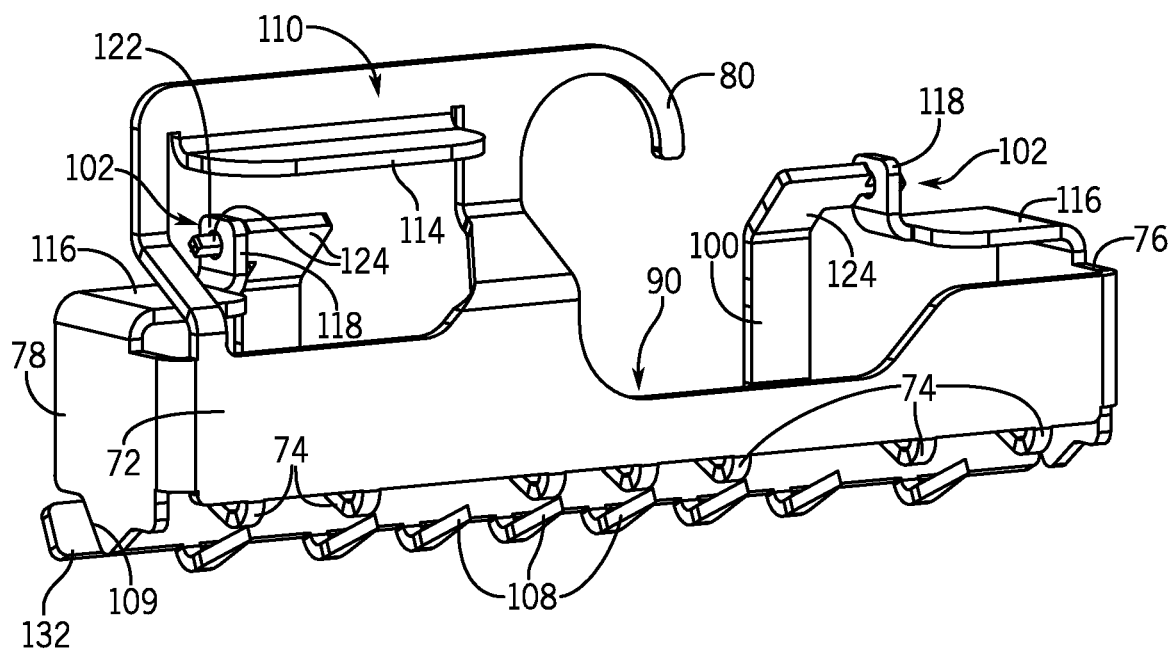
FIG. 23 is a slightly different perspective view from the rear upper left of a top meat processing device in accordance with the present invention.
Figure 24:
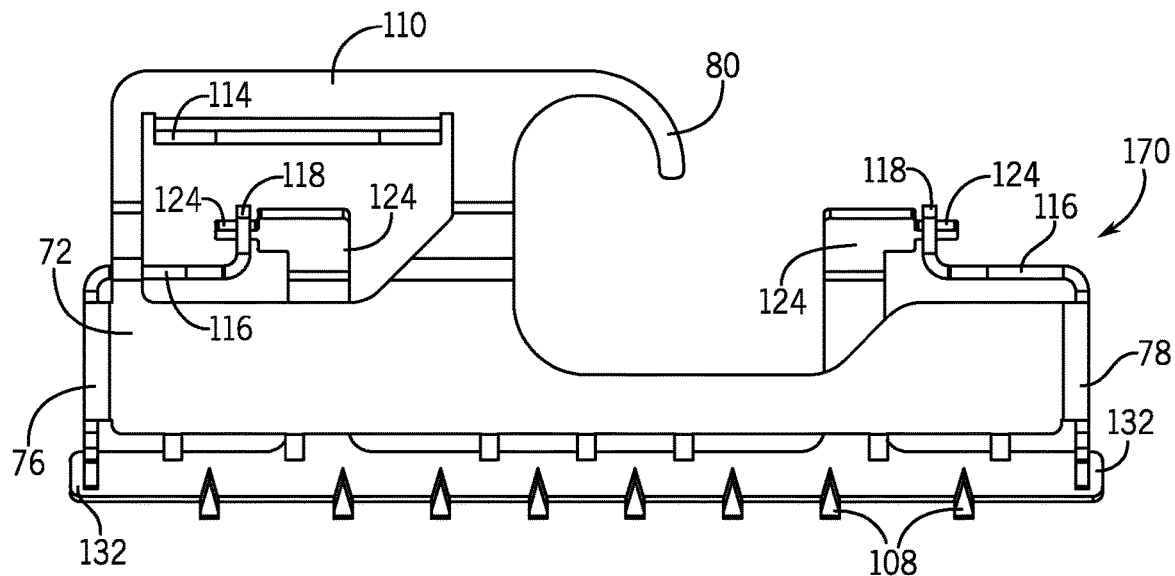
FIG. 24 is a rear view of the top meat processing device of FIG. 21.
Figure 25:
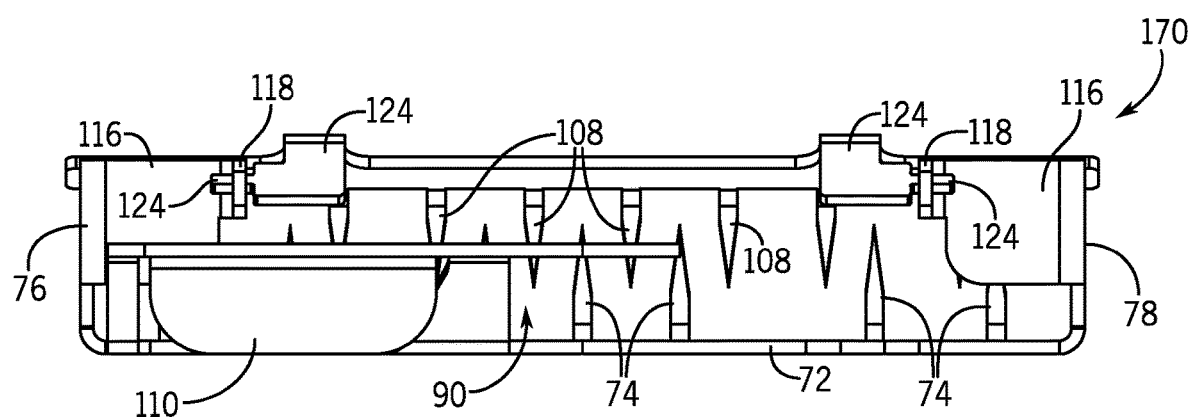
FIG. 25 is a top view of the top meat processing device of FIG. 21.
Figure 26:
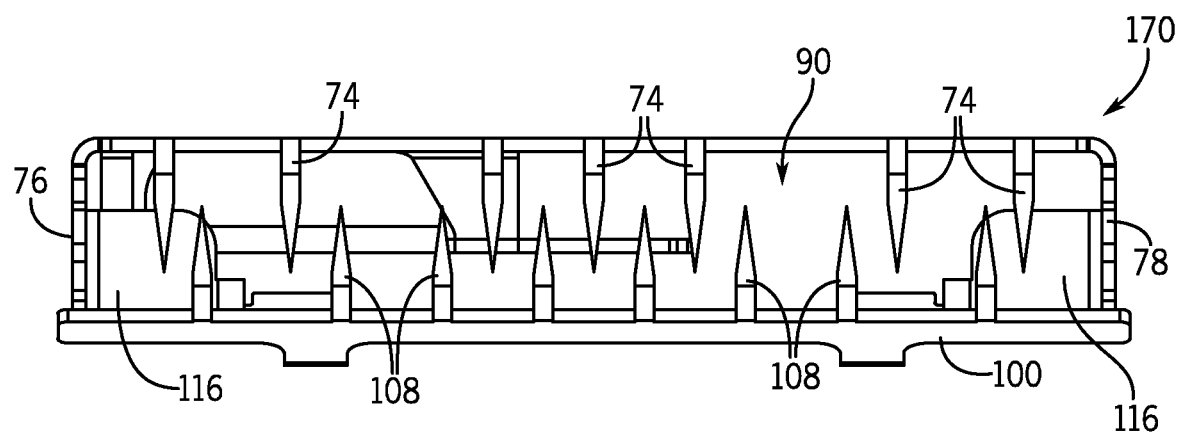
FIG. 26 is a bottom view of the top meat processing device of FIG. 21.
Figure 27:
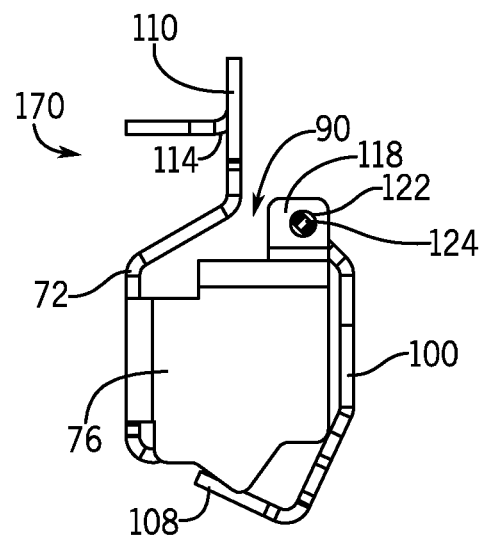
FIG. 27 is a left side view of the top meat processing device of FIG. 21.
Figure 28:
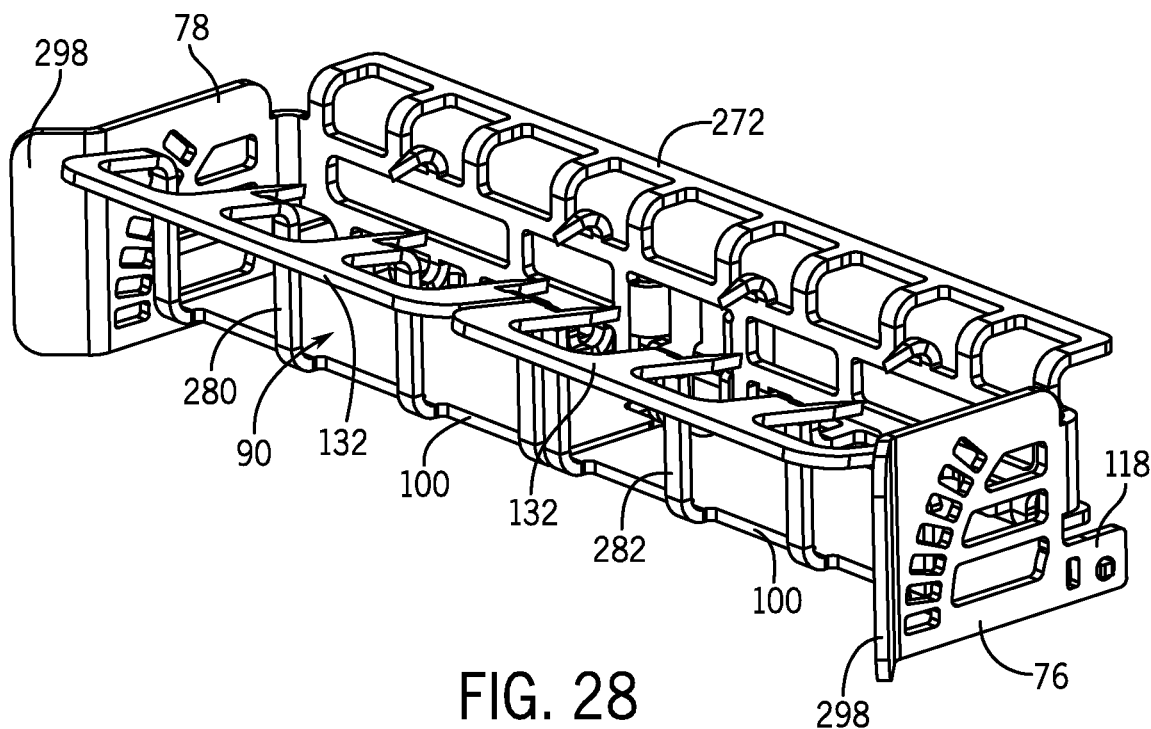
FIG. 28 is an upper right front perspective view of a bottom meat processing device in accordance with the present invention.
Figure 29:
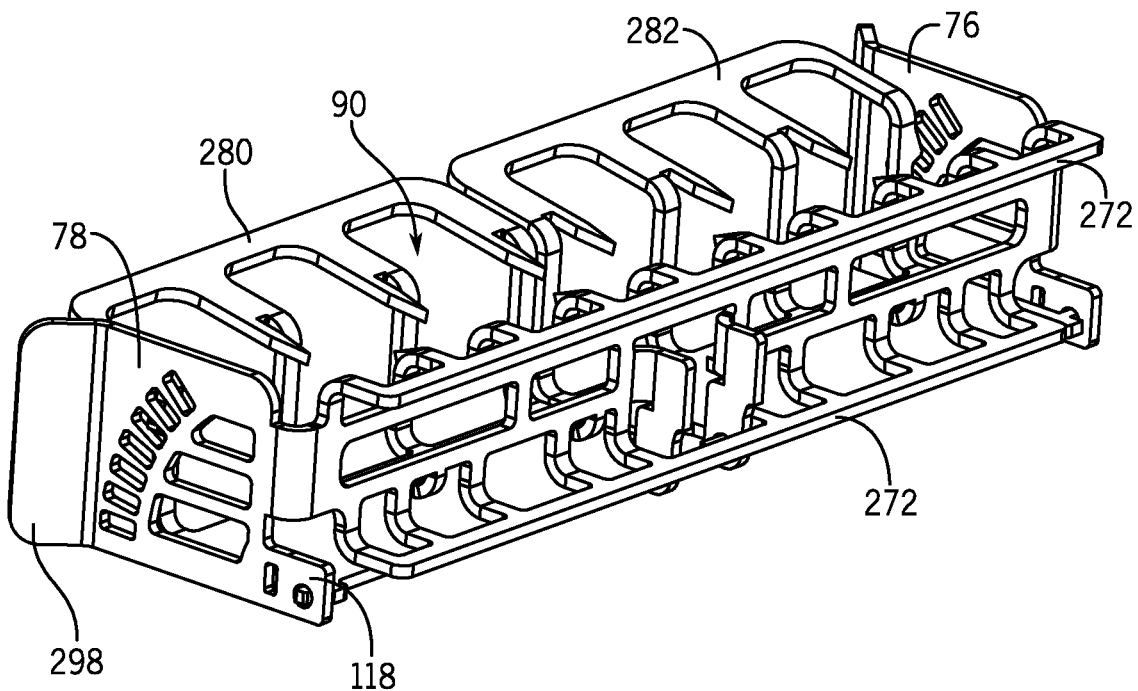
FIG. 29 is a bottom right perspective view of the meat processing device of FIG. 28.
Figure 30:
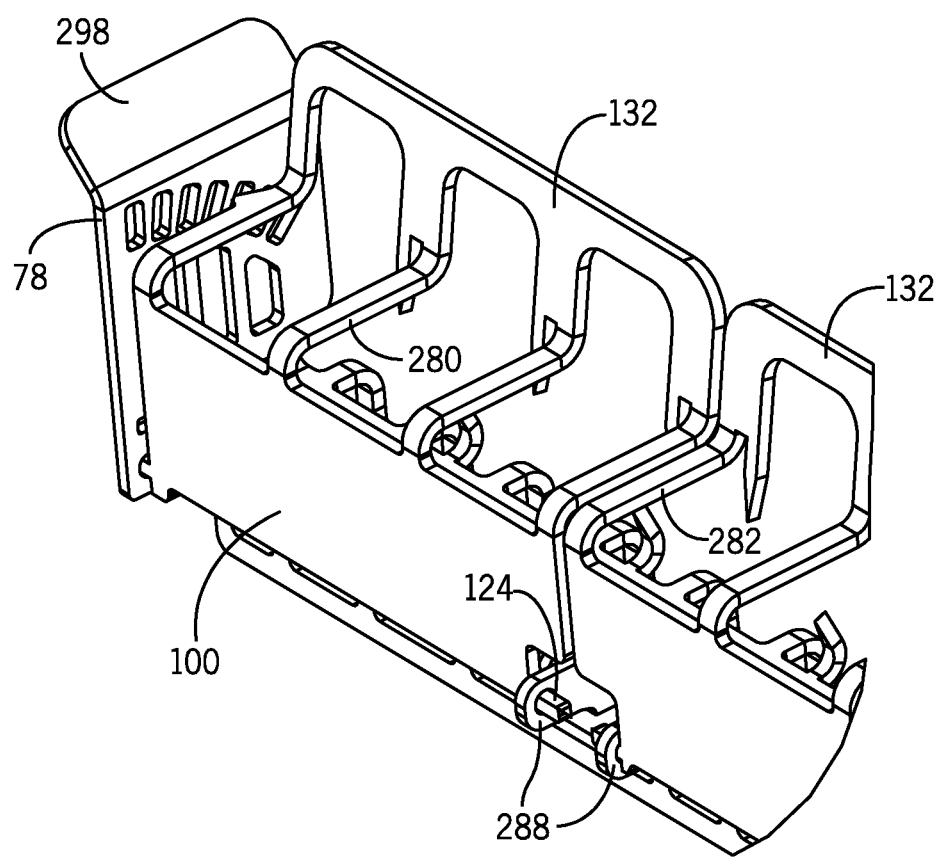
FIG. 30 is a partial upper left perspective view of the meat processing device of FIG. 28.
Figure 31:
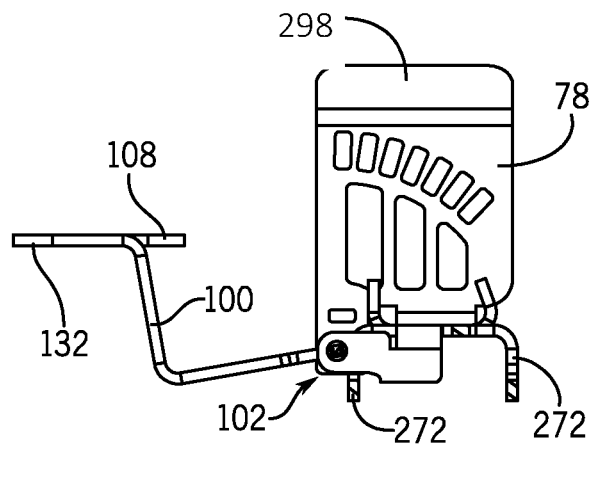
FIG. 31 is a left side view of the bottom meat processing device of FIG. 28 with a cover in an open position.
Figure 32:
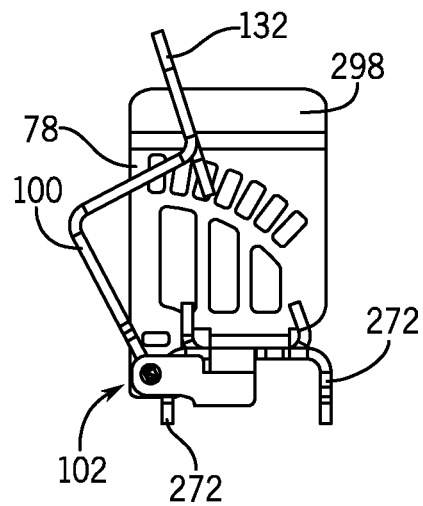
FIG. 32 is a left side view of the bottom meat processing device of FIG. 28 with the cover in a first closed position.
Figure 33:
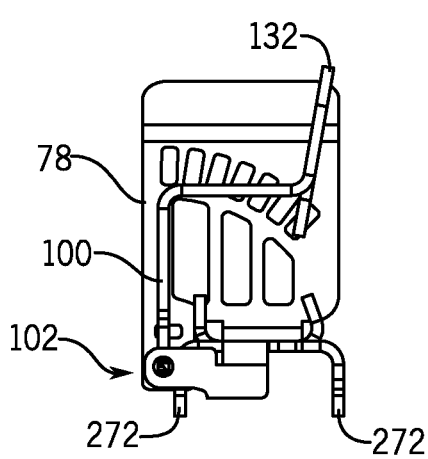
FIG. 33 is a left side view of the bottom meat processing device of FIG. 28 with the cover in a second closed position.

FIG. 11 illustrates another meat processing device 270 embodiment that is held tight against the bottom of the pork belly 52 during hanging, by spring-loaded hooks 110 attached to an upper meat processing device 170. The hooks 110 need not be spring-loaded, but springs 111 aid in applying tension to the device 270 for improved support. The hooks 110 can be any length and they may attach to the meat, but preferably attach to a meat processing device 170 joined to the top of the meat, as taught herein.

Hanging of the pork belly 52 slabs allows the rest of the pork belly 52 slab to conform to the width dimension of the flank end device 170. These devices and embodiments increase the slicing yields of the bacon slab.

FIGS. 12 to 19 illustrate a meat processing system in accordance with the present invention, and the system includes both meat processing devices 170 and 270 attached to a pork belly 52. The meat processing device 170 is joined to a top or flank end portion 62 of the pork belly 52, and the meat processing device 270 is joined to the bottom or brisket end portion 64 of the pork belly 52. Both of the meat processing devices 170 and 270 define confinement spaces 90 in which the respective end portion 62 and 64 is confined for processing in a smokehouse. Also, both of the meat processing devices 170 and 270 have the same general components as those described above for the embodiments of FIGS. 4 through 11, except for the modifications described below.

As seen in FIGS. 20 through 27, the meat processing device 170 on top includes a frame 72, frame tines 74, a first shoulder 76, a second shoulder 78, a hanging hook 80, and a confinement space 90. This embodiment of the top meat processing device 170 is made of bent and machined stainless steel plate for rigidity and durability, but other materials and manufacturing methods can be used.

The frame 72 has a plate structure and the first shoulder 76, the second shoulder 78, the tines 74, and the handle 80 are all preferably formed from the same plate and bent to the illustrated shape. In addition, the embodiment illustrated in FIGS. 20 through 27 includes a handle 110 to make it easier to lift and hang the meat processing device 170 with a pork belly 52 onto a rack, as illustrated below in relation to FIG. 39. The handle 110 can include a comfort feature 114 of a rounded edge, so that the edge of the plate forming the handle 110 is not uncomfortable to hold.

Further, the first shoulder 76 and the second shoulder 75 each include extensions 116 that extend inwardly, and above the confinement space 90. Each extension 116 includes a hinge tab 118 extending upwardly, and each hinge tab 118 defines a hinge hole 122, as part of the hinge 102. The cover 100 includes a pair of outwardly extending hinge projections 124, and each hinge projection 124 extends through a mating hinge hole 122 to form a hinge 102. Other hinge designs can be used in the present invention.

The cover 100 includes cover tines 108, and preferably a pair of push tabs 132 to assist in piercing the pork belly 52 with the cover tines 108. Preferably, a stop 109 is used to prevent over travel by the cover 100, as seen engaging the push tabs 132 in FIGS. 20 to 22, for example.

These meat processing devices control the shape of the ends of the pork belly 52 slab, so they are quite uniform after being processed in the smoker. Additionally, the pork belly 52 becomes longer and narrower while hanging on a rack during holding after injection and during the smokehouse process. The meat treatment devices constrain the end of a raw pork belly 52 that is up to seventeen inches or more wide at the flank end to a width of nine or ten inches wide after heating and chilling. The pork belly 52 slab will have substantially improved dimensional uniformity and stability.

The meat processing device in FIGS. 28 to 36 is able to form the brisket or lower end of the bacon slab so that it is flat and squared. Many slabs will only lose one slice before slices will be acceptable to be packaged as first quality product using this device 270.

In FIGS. 28 through 38, the meat processing device 270 is used at the bottom 64 of the pork bellies 52 (See FIGS. 13 through 19.) This meat processing device 270 does not require a hanging hook because it simply attaches to the bottom 64 of the pork belly 52 to confine the shape of the bottom portion 64. This meat processing device 270 is optional when the top meat processing device 170 is used, but it is used to provide a uniform shape to the pork belly 52. Further, this bottom meat processing device 270 can be used alone, without the top meat processing device 170.

The bottom meat processing device 270 is similar in function to the bottom meat processing device of FIG. 10, and includes a frame 72, frame tines 74, a first shoulder 76, a second shoulder 78, a cover 100 joined to the frame 72 at a hinge 102, cover tines 108, and a confinement space 90. This embodiment of the meat processing device 270 is formed of stainless steel plate, and is cut, milled, and bent into the various shapes illustrated. Nonetheless, other materials, shapes, and manufacturing methods are possible.

The frame 72 includes a first end portion and a second end portion with holes to reduce weight and allow the smoking process to act on the lower portion 64 of the pork belly 52. Frame tines 74 are preferably provided in a double row (FIG. 35), and are machined out of, or are otherwise joined to, the frame 72 and bent or otherwise oriented downwardly when attached to the pork belly 52. The illustrated frame 72 also includes frame flanges 272 that add rigidity to the meat processing device 270, as well as provide a convenient stand (see FIGS. 31 through 38) while the pork belly 52 is being inserted into the confinement space 90.

The cover 100 in this embodiment is formed by two halves, a first half cover 280 and a second cover half 282 to make it easier to close the cover 100. Each cover half 280/282 includes cover tines 108 and is joined to the frame 72 at a hinge 102.

The hinge 102 includes hinge tabs formed with or joined to the frame 72. The hinge tabs 118 define hinge holes 122 into which hinge projections 124 on the cover halves 280 and 282 extend. To accommodate the hinge projections 124 on the interior portions of the cover halves 280/282, a pair of central hinge plates 288 are either formed from or joined to the frame 72. The hinge 102 can be formed in other ways and even be a separate component used to join the cover 100 for pivoting movement to the frame 72.

The frame tines 74 and the cover tines 108 are intended to pierce the pork belly 52 to grip the meat and entrap the lower end 64 of the pork belly 52 in the confinement space 90. Nonetheless, only the weight of the meat processing device 270 needs to be supported, so the tines 74 and 108 need not necessarily pierce the pork belly 52, and may be used to simply engage or grip the pork belly 52 during use.

To further improve engagement of the meat processing device 270 to the pork belly 52, the cover 100 can be locked into a closed position (FIGS. 28 to 38) using a releasable locking mechanism 290 to clamp down on the meat, for example. The releasable locking mechanism 290 preferably includes a shoulder lock component, such as recesses or holes 292 arranged in an arc-shaped pattern in one or both of the first shoulder 76 or the second shoulder 78. A mating cover lock component, such as a tab 294 is attached to or part of the cover 100, so that pivoting the cover 100 (or cover halves 280 and 282) about the hinge 102 brings the mating tab 294 into engagement with at least one of the holes 292.

Resiliency in either the frame 72, shoulders 76/78, or the mating tab 294 provides releasable engagement between the two. Resiliency further enables the mating tab 294 to engage successive holes 292 so that the cover 100 can be releasably locked into a variety of positions (see FIGS. 31 to 34) to close down the confinement space 90 and accommodate pork belly 52 lower ends 64 of varying thicknesses, especially when used with a pair of cover halves 280/282. Flexing the shoulders 76/78 outwardly using flanges 298 releases the mating tab 294 from a hole 292 so the cover 100 can be opened. (See FIGS. 35 and 36 for the open position.) Other locking mechanisms 290 can be used, including those having other shoulder lock components or other cover lock components, but the illustrated embodiment is simple to manufacture, use, and clean. Further, a locking mechanism could be used on the top meat processing device 170, if desired.

Figure 34:
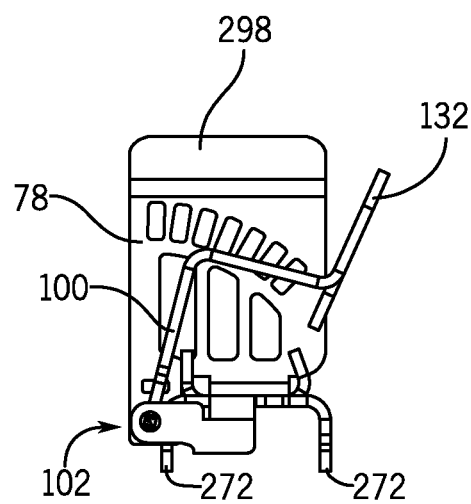
FIG. 34 is a left side view of the bottom meat processing device of FIG. 28 with the cover in a third closed position.
Figure 35:
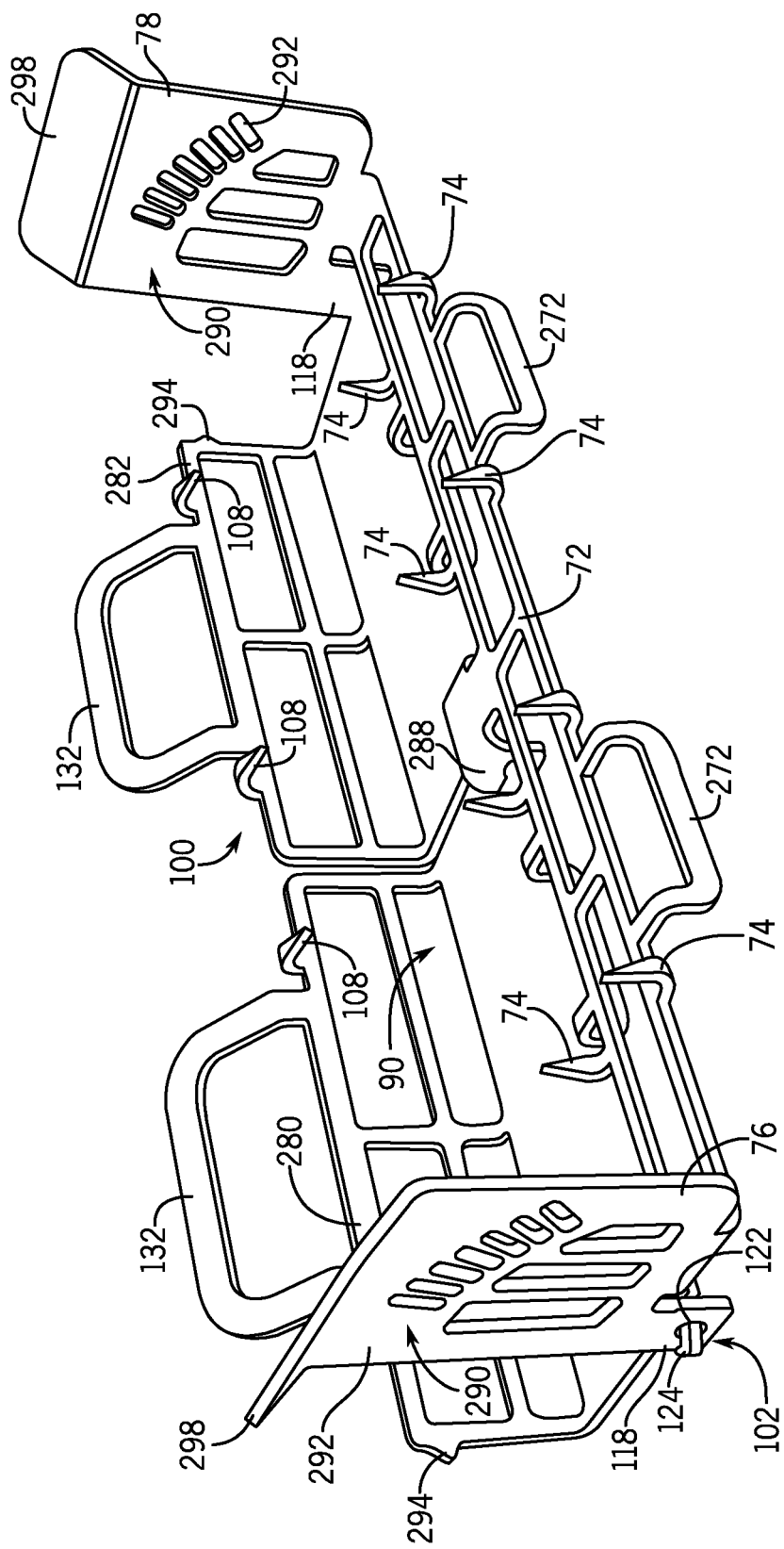
FIG. 35 is an upper left front perspective view of the bottom meat processing device of FIG. 28 with two covers in the open position.
Figure 36:
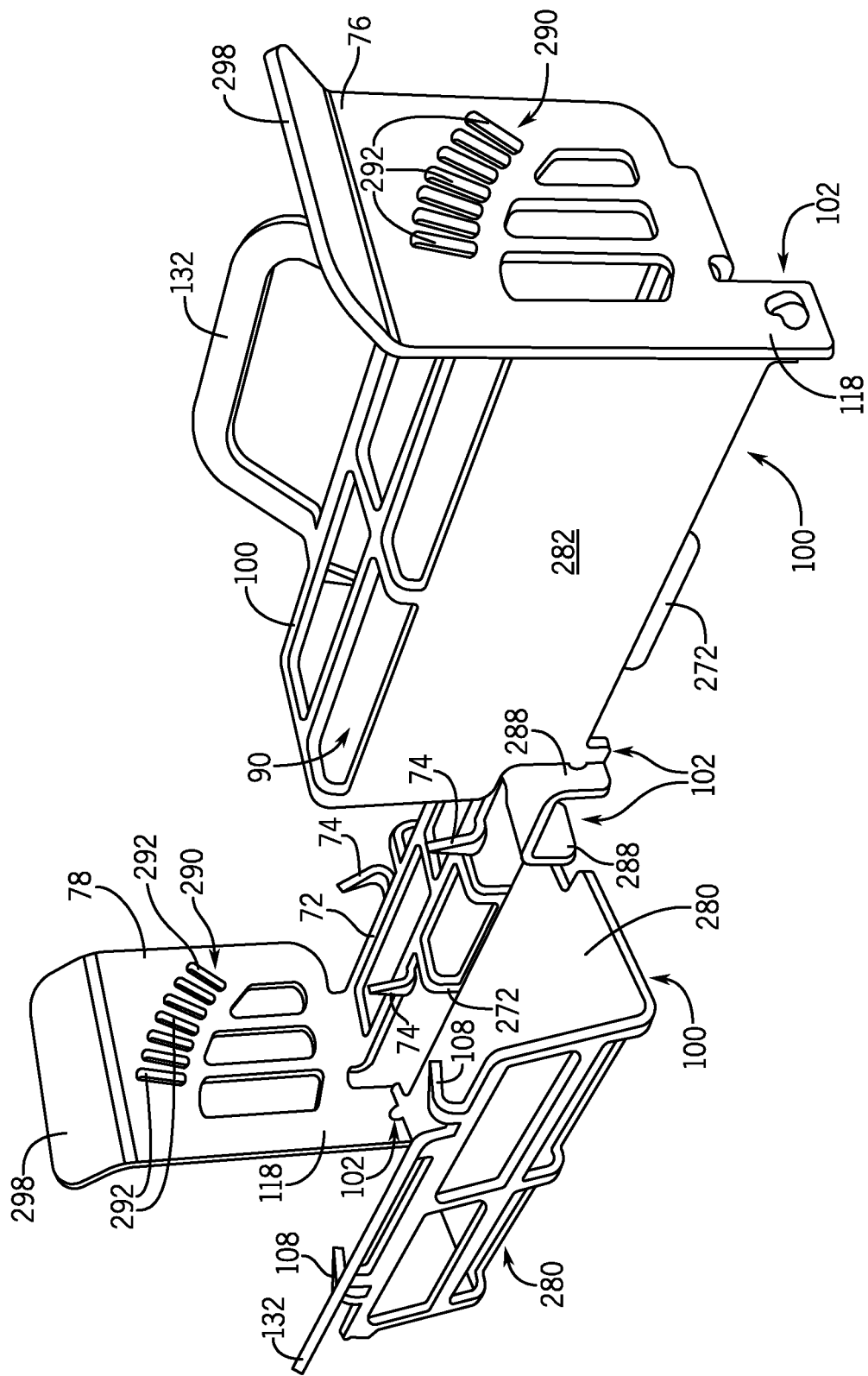
FIG. 36 is an upper left rear perspective view of the bottom meat processing device of FIG. 28 with one cover open and one cover closed.
Figure 37:
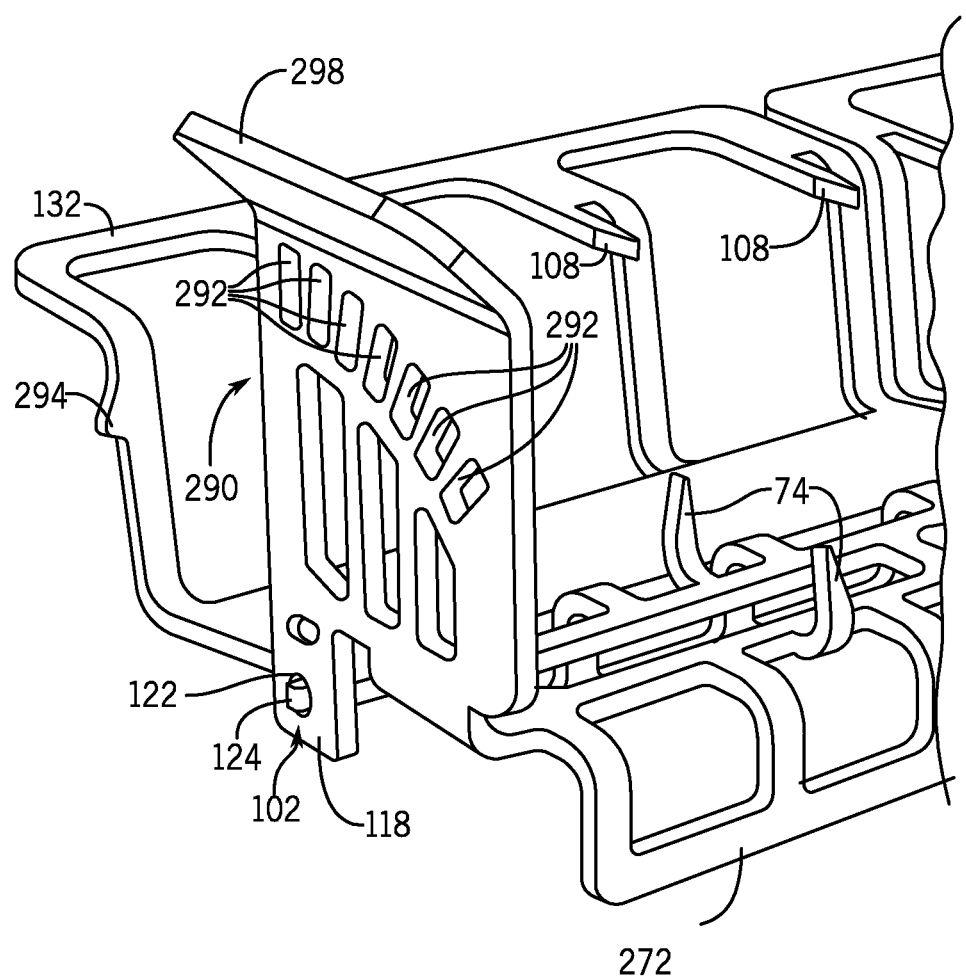
FIG. 37 is a partial perspective view of an alternate bottom meat processing device.
Figure 38:
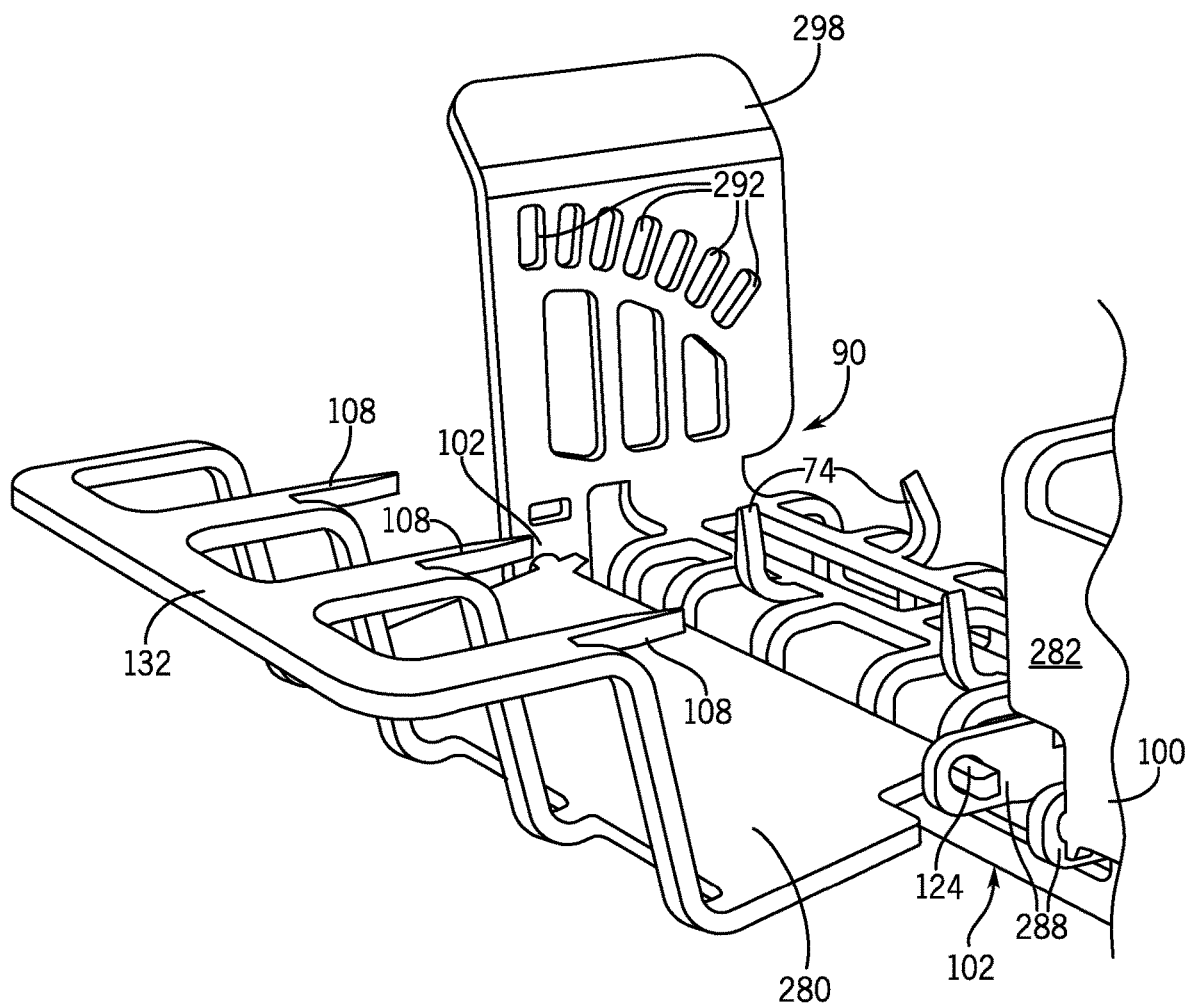
FIG. 38 is a partial perspective view of the alternate bottom meat processing device of FIG. 37.

FIGS. 36 and 37 illustrate slightly different versions of the bottom meat processing device 270 of FIGS. 34 and 35, but the differences are primarily in the shapes of the components and not in function.

Once the top and bottom meat processing devices 170 and 270 are attached to pork bellies 52, they are transferred to racks or trolley 300, as seen in FIG. 39. The present invention results in an efficient space-saving arrangement of pork bellies 52 on the trolleys 300, so they can be rolled into a smoker and processed efficiently and uniformly with optimum yields.

In addition to the yield increases and quality improvement with this invention there are significant capacity benefits. For bacon manufacturers, a common 3×2 hanging pattern with the two lower level layers nested between the three upper layers. The preferred upper hanger FIG. 39 is 2 to 3 inches shorter in height when hanging than bacon combs currently in routine use in the bacon industry. Because of this and being able to modify existing trolleys/racks as currently used in most stationary smokehouses by raising the upper level hanging bars 2 to 3 inches and lowering the lower level hanging bars by 2 to 3 inches two layers of bellies are able to be hung on a trolley/rack, without nesting, as depicted in FIG. 39. Also, because of the much narrower hanging procedure/devices, four rows of bellies are able to be hung on each layer without nesting instead of the current 3×2 hanging pattern. This is a 60% capacity increase on each trolley. This translates into a 60% increase in pounds processed during each smokehouse and chilling cell cycle. Significant reductions in heating and chilling costs, smoke emissions, and smokehouse and chill cell cleaning chemicals used per pound of product produced are additional benefits. Significantly more bacon can be produced with the current equipment, thereby not needing to require a facility expansion for these two areas until bacon demand exceeds the new increased capacity.

The foregoing detailed description of the invention is provided for clearness of understanding the drawings and the present invention, but no unnecessary limitations therefrom should be read into the following claims.

The invention claimed is:

1. A meat processing device comprising:
   a frame having a first end portion and a second end portion;
   a shoulder joined to the first end portion of the frame to at least partially define a confinement space with the frame;
   a frame tine joined to and extending outwardly from the frame and into the confinement space; and
   a cover joined to the frame to pivot between an open position and a closed position to at least partially define the confinement space.

2. The meat processing device of claim 1, and further comprising:
   a second frame tine joined to and extending outwardly from the frame and into the confinement space.

3. The meat processing device of claim 1, and further comprising:
   a second shoulder joined to the second end portion of the frame to at least partially define the confinement space with the frame and the shoulder.

4. The meat processing device of claim 1, and further comprising:
   a cover joined to the frame to at least partially define the confinement space.

5. The meat processing device of claim 1, and further comprising:
   a cover tine joined to the cover and extending toward the frame.

6. The meat processing device of claim 1, wherein the cover includes:
   a first portion; and
   a second portion disposed at an angle to the first portion, and spaced apart from the frame in the closed position to at least partially define the confinement space.

7. The meat processing device of claim 1, wherein the cover includes:
   a first portion;
   a second portion disposed at an angle to the first portion, and spaced apart from the frame in the closed position to at least partially define the confinement space; and
   a cover tine joined to and extending outwardly from the cover into the confinement space in opposition to the tine joined to the frame.

8. The meat processing device of claim 1, and further comprising:
   a hanging hook formed integrally with the frame.

9. The meat processing device of claim 1, and further comprising:
a hanging hook joined to the frame.

10. The meat processing device of claim 1, wherein the cover includes:
a first portion;
a second portion disposed at an angle to the first portion, and spaced apart from the frame when in the closed position to at least partially define the confinement space; and
a cover tine joined to and extending outwardly from the cover in opposition to the tine joined to the frame; and
a plurality of additional frame tines joined to the frame and extending toward the cover when in the closed position.

11. The meat processing device of claim 1, wherein:
the frame comprises a central portion between the first portion and the second portion; and
at least a portion of the shoulder extends toward the central portion to define a tapered confinement space.

12. The meat processing device of claim 1, and wherein:
the cover releasably engages the shoulder when in the closed position.

13. The meat processing device of claim 1, wherein the shoulder defines a shoulder lock component, and
the cover includes a cover lock component for releasably engaging the shoulder lock component in the closed position.

14. The meat processing device of claim 1, wherein the shoulder defines a plurality of shoulder lock components; and
the cover includes a cover lock component for selectively and releasably engaging at least one of the shoulder lock components when the cover is in the closed position.

15. The meat processing device of claim 1, wherein the shoulder defines a shoulder lock component; and
the cover includes a cover lock component for releasably engaging the shoulder lock component in the closed position.

16. The meat processing device of claim 1, wherein the shoulder defines a plurality of shoulder lock components; and
the cover includes a cover lock component for selectively and releasably engaging at least one of the shoulder lock components when the cover is in the closed position.

17. The meat processing device of claim 1, and further comprising:
a plurality of cover tines joined to the cover and extending in an opposing direction to the frame tine.

18. The meat processing device of claim 1, wherein the shoulder defines a shoulder lock recess; and
the cover includes a cover lock tab for releasably engaging the shoulder lock recess in the closed position.

19. The meat processing device of claim 1, wherein the shoulder defines a plurality of shoulder lock recesses; and
the cover includes a cover lock component to selectively and releasably engage at least one of the shoulder lock recesses when the cover is in the closed position.

20. The meat processing device of claim 1, and further comprising a second meat processing device having:
a second frame having a first end portion and a second end portion;
a frame tine joined to and extending outwardly from the second frame between the first end portion and the second end portion; and
a shoulder joined to the first end portion of the second frame to at least partially define a second confinement space with the second frame.

21. The meat processing device of claim 1, and further comprising:
a second cover joined to the frame to move independently of the first cover and between an open position and a closed position to at least partially define the confinement space.

22. The meat processing device of claim 1, and further comprising:
a second cover joined to the frame to define a closed position to at least partially define the confinement space; and
a handle joined to the first cover.

23. The meat processing device of claim 1, and further comprising:
a stop to engage the cover at a predetermined position.

24. The meat processing device of claim 1, and further comprising:
a support leg joined to the frame.

25. The meat processing device of claim 12, wherein the shoulder includes a release tab extending away from the frame to disengage the cover and the shoulder.

26. The meat processing device of claim 1, and further comprising:
a second tine spaced apart from the tine, and projecting into the confinement space.

* * * * *